US006826231B2

(12) United States Patent
Takahashi et al.

(10) Patent No.: US 6,826,231 B2
(45) Date of Patent: Nov. 30, 2004

(54) MOTION VECTOR CONVERSION OF INTERLACED MPEG-2 TO PROGRESSIVE MPEG-4

(75) Inventors: Kuniaki Takahashi, Kanagawa (JP); Kazushi Sato, Kanagawa (JP); Teruhiko Suzuki, Chiba (JP)

(73) Assignee: Sony Corporation (JP)

( * ) Notice: Subject to any disclaimer, the term of this patent is extended or adjusted under 35 U.S.C. 154(b) by 486 days.

(21) Appl. No.: 09/973,749

(22) Filed: Oct. 11, 2001

(65) Prior Publication Data

US 2002/0122488 A1 Sep. 5, 2002

(30) Foreign Application Priority Data

Oct. 12, 2000 (JP) ..................... P2000-312309

(51) Int. Cl.[7] .................................. H04N 7/12
(52) U.S. Cl. ................................. 375/240.16
(58) Field of Search ................. 375/240.01, 240.12, 375/240.13, 240.16, 240.24; H04N 7/12

(56) References Cited

U.S. PATENT DOCUMENTS

2002/0031179 A1 * 3/2002 Rovati et al. .......... 375/240.16

2003/0099292 A1 * 5/2003 Wang et al. ........... 375/240.12

FOREIGN PATENT DOCUMENTS

| JP | 2000-129002 | 5/2000 |
| JP | 2000-132915 | 5/2000 |
| JP | 2000-191616 | 7/2000 |
| JP | 2000-310836 | 8/2002 |

* cited by examiner

Primary Examiner—Young Lee
(74) Attorney, Agent, or Firm—Rader, Fishman & Grauer PLLC; Ronald P. Kananen

(57) ABSTRACT

The invention provides a motion vector conversion method by which the coding efficiency in image coding of MPEG4 in an image information conversion method can be further augmented. In the motion vector conversion method for an image information conversion method, every other one of P frames of a bit stream of MPEG2 is dropped to produce a bit stream of MPEG4 of a reduced frame rate and a low bit rate. Also for motion vector modification, information of each of macro blocks and between blocks in the inputted bit stream representative of image compression information of MPEG2 is stored in advance, and motion vectors of a P frame immediately preceding to each P frame to be dropped are duplicated based on the stored information. Then, the duplicated motion vectors are extended to twice in the temporal direction to produce motion vectors of MPEG4 converted from an intraframe of MPEG2.

2 Claims, 37 Drawing Sheets

FIG. 10 PRIOR ART

| REMAINDER WHEN MOTION VECTOR MV BEFORE CONVERSION IS DIVIDED BY 4 | 0 | 1 | 2 | 3 |
|---|---|---|---|---|
| MOTION VECTOR AFTER CONVERSION | [MV/2] | [MV/2]+1 | [MV/2] | [MV/2] |

[MV/2] REPRESENTS INTEGER PART WHEN MV IS DIVIDED BY 2

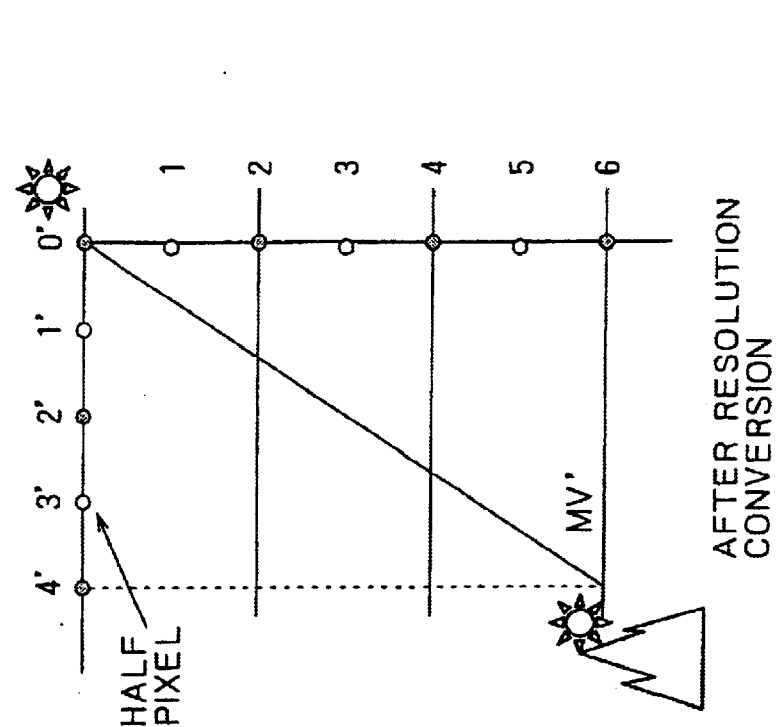
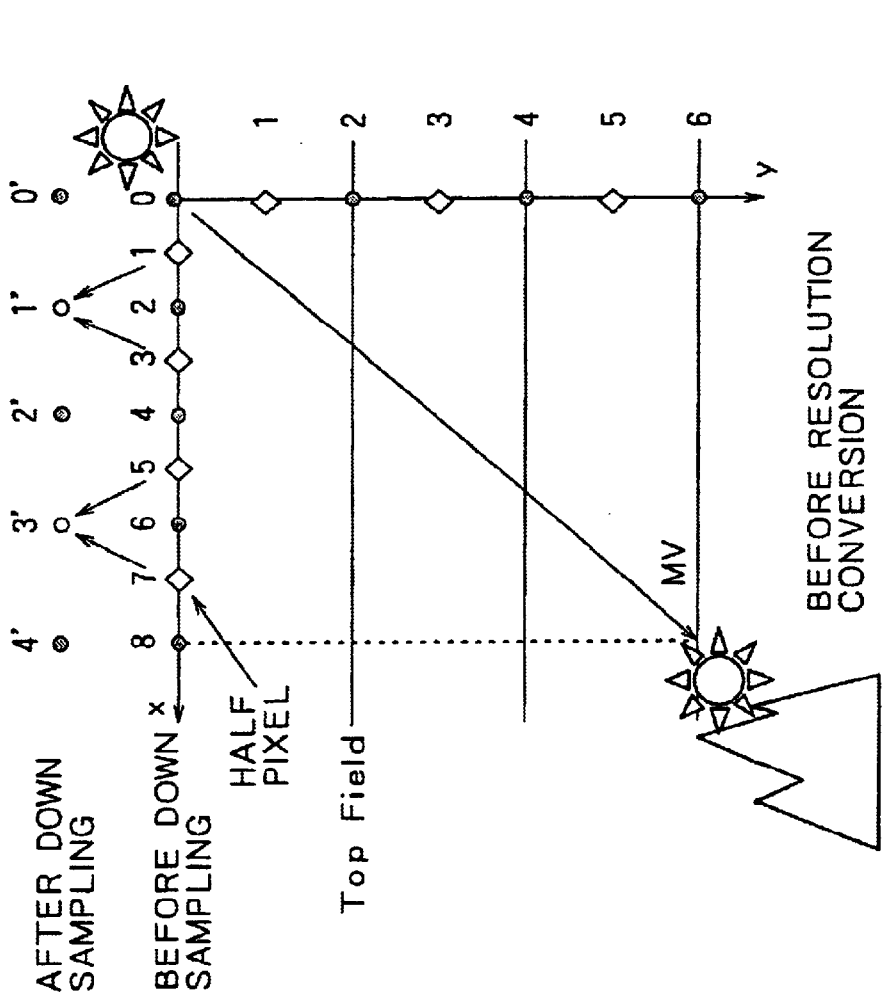

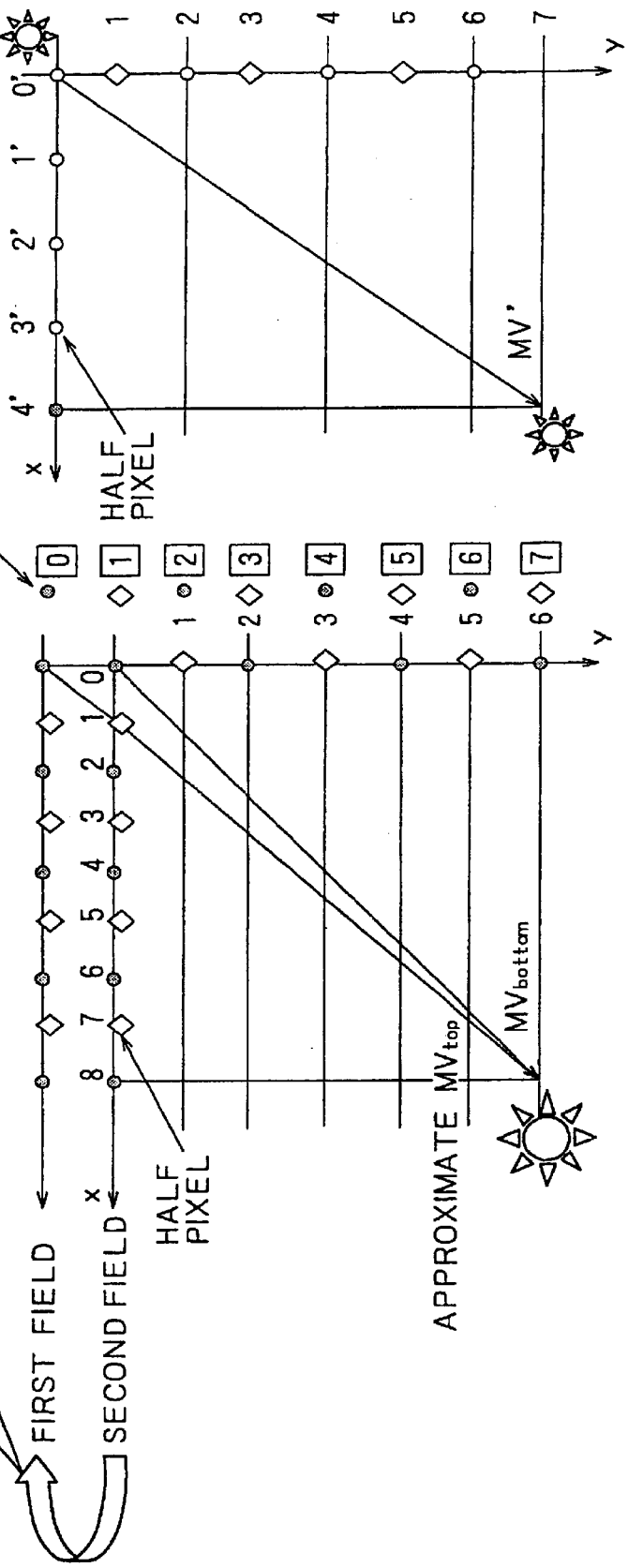

FIG. 18 PRIOR ART

| REMAINDER WHEN MOTION VECTOR MV BEFORE CONVERSION IS DIVIDED BY 4 | 0 | 1 | 2 | 3 |
|---|---|---|---|---|
| MOTION VECTLE AFTER CONVERSION | [MV/2] | [MV/2] | [MV/2]+1 | [MV/2] |

[MV/2] REPRESENTS INTEGER PART WHEN MV IS DIVIDED BY 2

AFTER RESOLUTION CONVERSION

BEFORE RESOLUTION CONVERSION
AFTER DOWN SAMPLING
HALF PIXEL
FIRST FIELD

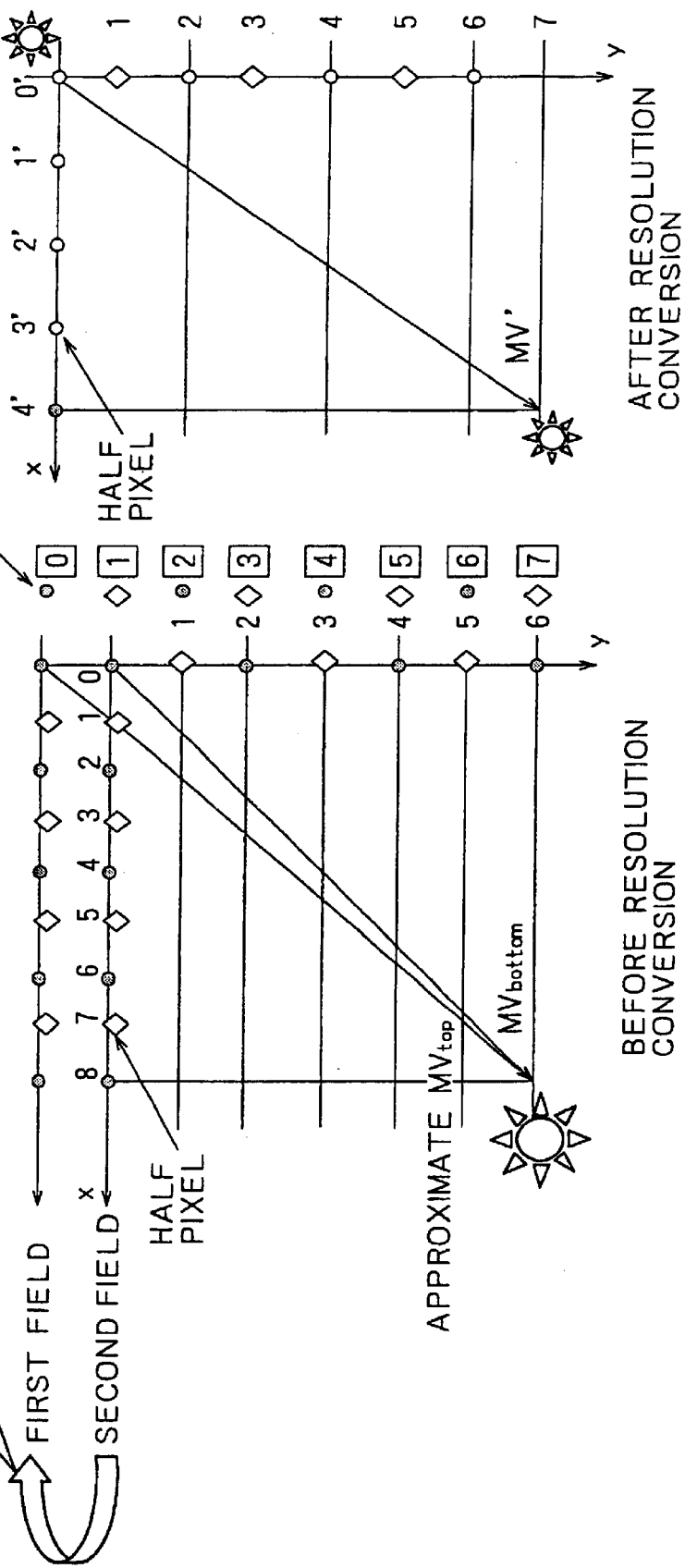

○ MPEG2 INTEGER PIXEL ● MPEG4 INTEGER PIXEL
◇ MPEG2 HALF PIXEL

MODIFICATION FROM MPEG2
INTEGER PIXEL TO MPEG4

MOTION VECTOR
FORWARD DIRECTION

MODIFICATION FROM MPEG2 INTEGER
PIXEL TO MPEG4 INTEGER PIXEL
OF FORWARD DIRECTION

MOTION VECTOR
FORWARD DIRECTION

○ MPEG2 INTEGER PIXEL  ● MPEG4 INTEGER PIXEL

◇ MPEG2 HALF PIXEL

MODIFICATION FROM MPEG2 INTEGER PIXEL TO MPEG4 INTEGER PIXEL VALUE OF FORWARD DIRECTION

MOTION VECTOR FORWARD DIRECTION →

MODIFICATION FROM MPEG2 INTEGER PIXEL TO MPEG4 INTEGER PIXEL VALUE OF REVERSE DIRECTION

MOTION VECTOR FORWARD DIRECTION →

PRIOR ART
FIG.25

MPEG2 N15M3  BBIBIPBBPBBPBBPBBPBBPBBPBBPBBI
→ I
→ P
→ P
→ P
→ I

MPEG4 N5M1
→ P

MPEG2
DROP P-frame
I — P — P

MPEG4
I — P — P

MPEG2
DROP I-frame
P — I — P

MPEG4
P — P

MOTION VECTOR CONVERSION OF INTERLACED MPEG-2 TO PROGRESSIVE MPEG-4

CROSS-REFERENCE TO RELATED APPLICATIONS

This application is based upon and claims the benefit of priority from the related Japanese Patent Application No. 2000-312309, filed Oct. 12, 2000, the entire contents of which are incorporated herein by reference.

The present application also contains the subject matter related to concurrently filed U.S. patent applications by Takahashi, et al. entitled "Motion Vector Conversion Method and Conversion Apparatus", based upon and claims the benefit of priority from the related Japanese Patent Application No. 2000-310836.

The related applications are assigned to the same assignee as the present application.

BACKGROUND OF THE INVENTION

This invention relates to a motion vector conversion method and a motion vector conversion apparatus for use with an image information conversion method and an image information conversion apparatus wherein the MPEG system is used to receive, through a satellite broadcast, a cable TV or network media such as the Internet, or process, on such storage media as an optical or magnetic disk or a flash memory, a bit stream representative of image information compressed by orthogonal transform such as discrete cosine transform and motion compen sation.

In recent years, an apparatus which complies with the MPEG system wherein image information is treated as digital data and compressed by orthogonal transform such as discrete cosine transform and motion compensation maki ng use of the redundancy unique to the image information in order to transmit and store the information with a high efficiency has been and is being popularized in both information distribution of broadcasting stations and so forth and information re cept ion in general homes.

Particularly, the MPEG2 (ISO/IEC 13818-2) is defined as a general purpose image coding system and is a standardized system which covers both interlaced scanned images and progressively scanned images as well as standard resolution images and high resolution images. It is estimated that the MPEG2 is used for a wide variety of applications for professi onal use and for consumer use also in the future. The use of the compression system of MPEG2 can achieve a high compress ion ratio and a good picture quality, for example, for both interlaced scanned images of a standard resolution having 720×480 pixels or interlaced scanned images of a high resolution having 1,920×1,088 pixels at 4 to 8 Mbps by allocating a code rate (bit rate) of 18 to 22 Mbps.

Although MPEG2 is directed principally to high picture duality coding suitable for broadcasting, it is not ready for a lower code rate (bit rate) than that of MPEG1, that is, it is not ready for a coding system of a higher compression ratio. It is considered that the need for such a coding system as just described increases in the future a popularization of portable terminals proceeds. In order to cope with the need, standardization of the MPEG4 coding system has been performed. The standards for the MPEG4 image codi ng system have been approved as international standards as ISO/IEC 14496-2 in December 1998.

Meanwhile, it is requested to convert a bit stream which represents image compression information of MPEG2 coded once for digital broadcasting into another bit stream representative of image compression information of MPEG4 of a lower code rate (bit rate) which is more suitable for processing on a portable terminal or the like.

An example of a related art image information conversion apparatus which satisfies the request is shown in FIG. 1. Referring to FIG. 1, the image information conversion apparatus shown converts a bit stream representative of image compression information of MPEG2 inputted thereto into another bit stream representative of image compression information of MPEG4. In particular, the inputted bit stream representative of image compression information of MPEG2 is decoded by an MPEG2 image information decoding apparatus 1. The decoded image signal is transmitted to a resolution frame rate conversion apparatus 2, by which it is converted into an image signal having an arbitrary different resolution and frame rate. The image signal obtained by the conversion is inputted to an MPEG4 image information coding apparatus 3, by which it is coded into and outputted as a bit stream representative of image compression information of MPEG4.

In the related art image information conversion apparatus, as seen in FIG. 1, the image signal decoded in accordance with the MPEG2 decoding system is coded by the MPEG4 image information coding apparatus, and a bit stream representative of image compression information of MPEG4 is outputted. The MPEG2 image information decoding apparatus 1 may be configured such that it performs a decoding process for both horizontal and vertical direction components using all eighth order DCT (discrete cosine transform) coefficients of the bit stream representative of the inputted image compression information of MPEG2. However, the MPEG2 image information decoding apparatus 1 may be configured otherwise such that it performs a decoding process wherein all eighth order coefficients in the vertical direction are used but only four lower frequency ones of eighth order coefficients in the horizontal direction are used (the decoding process is hereinafter referred to as 4×8 down decoding) or another decoding process wherein only four lower frequency ones of eighth order coefficients in both the horizontal direction and the vertical directions are used (the decoding process is hereinafter referred to as 4×4 down decoding) in order to reduce the arithmetic operation amount and the video memory capacity and simplify down sampling processing in the following stage while suppressing the picture quality deterioration to the minimum.

According to such a related art method as described above, when the MPEG4 image information coding apparatus codes an image signal inputted thereto, the arithmetic opera tion processing amount for detecting a motion vector occupies approxima tely 60 to 70% of the total arithmetic operation processing amount. This gives rise to such problems that real time processing of an image becomes difficult, that a time delay occurs and that a large apparatus scale is required.

As a countermeasure for solving such problems as just described, the inventors have proposed an image information conversion apparatus shown in FIG. 2. Particularly, the inventors have filed the following applications for patent in Japan relating to the image conversion apparatus shown in FIG. 2.

Japanese Patent Application No. 2000-129002 "Motion Vector Conversion Apparatus and Method": This application discloses a technique wherein information of each of macro blocks of MPEG2 is used to select a motion vector of MPEG 2 of that one of macro blocks of MPEG2 which exhibits the highest coding efficiency to produce a motion vector of MPEG4.

Japanese Patent Application No. 2000-132915 "Motion Vector Conversion Apparatus and Method": This application discloses a technique wherein information of each of macro blocks is used to select, based on lengths of motion vectors, a motion vector of MPEG2 of that one of macro blocks of MPEG2 which exhibits the highest coding efficiency to produce a motion vector of MPEG4.

Japanese Patent Application No. 2000-191616 "Motion Vector Conversion Apparatus and Method": This application discloses a technique wherein information of each of macro blocks is used to produce a P-VOP motion vector for an intra-macro block of MPEG2.

FIGS. 3A and 3B illustrate a correlation between a motion vector in a bit stream representative of image compression information of MPEG2 and a motion vector in a bit stream representative of image compression information of MPEG4 and particularly show images of a current frame before and after resolution conversion, respectively. When the resolution of an image is converted, a horizontal component of a motion vector from the position in the preceding frame to a position in the current frame after the conversion can be determined from a horizontal component of a motion vector before the resolution conversion and the resolution conversion rate in the horizontal direction of the image. A vertical component of the motion vector after the resolution conversion can be determined from a vertical component of a motion vector before the resolution conversion and the resolution conversion rate in the vertical direction of the image. In other words, the motion vector before the resolution conversion a nd the motion vector aft er the conversion have a high correlation. The correlation can be utilized to determine the motion vector after the resolution conversion from the motion vector before the res oluti on conversion.

In particular, the image information conversion appara tus of FIG. 2 simply converts amotion vector in a bit stream representative of image compression information of MPEG2 inputted thereto into a mo tion vector of MPEG4 making use of parameters such as a motion vector of a macro block of MPEG2 and a macro block type. In an MPEG4 image information coding apparatus 7, detection of a motion vector is not performed, but image coding using motion vectors obtained by conversion is performed. As a result, the MPEG4 image information coding apparatus 7 does not perform motion detection, and consequently, the processing amount is reduced significantly.

By performing conversion from a motion vector of MPEG2 into a motion vector of MPEG4 and adopting a parameter used for decoding of MPEG2 or a parameter after conversion in addition to a motion vector in this manner, the processing amount of the MPEG4 image information coding apparatus 7 can be reduced. Consequently, the time delay by the MPEG4 image information coding apparatus 7 can be reduced.

The bit stream representative of the inputted image compression information of MPEG2 illustrated in FIGS. 3A and 3B undergoes decoding processing by an MPEG2 image information decoding apparatus 4 of FIG. 2, and a bit stream representative of image compression information of MPEG4 is out putted. The MPEG2 image information decoding apparatus 4 may be configured such that it performs a decoding pr ocess for both the horizontal and vertical directi on components using all eighth order DCT coefficients of the bit stream representat ive of the inputted image compression information of MPEG2. However, the MPEG2 image information decoding apparatus 4 may be configured otherwise such that it performs 4×8 down decoding or 4×4 down decoding in order to reduce the arithmetic operat ion amount and the video memory capacity And simplify down sampling processing in the following stage while suppressing the picture quality deterioration to the minimum. The image signal outputted from the MPEG2 image information decoding apparatus 4 is sent to a resolution frame rate conversion apparatus 5, in which resolution and frame conversion are performed and then an image signal having a resolution suitable for image coding of MPEG4 is produced with an image size adjustment flag inputted thereto from the outside. The thus produced image signal is outputted from the resolution frame rate conversion apparatus 5.

More particularly, the resolution frame rate conversion apparatus 5 first performs resolution conversion of the image signal inputted thereto from the MPEG2 image information decoding apparatus 4 by means of a resolution frame converter. Here, an example of resolution conversion wherein the resolution is reduced to ½ for both of the vertical and horizontal directions is described. As seen in FIG. 4, in the down sampling in the vertical direction, first fields or second fields of inputted interlaced scanned images are extracted to convert the images into progressively scanned images. In the down sampling in the horizontal direction, a down sampling filter is used to convert each image into an image of a ½ resolution. Further, in order to achieve a low bit rate, not only compression by resolution conversion is performed, but also first fields or second fields only of I/P pictures are extracted to lower the frame rate in the temporal direction. For example, I, B, B and P pictures of MPEG2 shown in FIG. 4 are converted into the first fields of the I and P pictures by resolution and frame rate conversion. The images obtained by the resolution and frame conversion include a number of pixels arranged in numbers of rows and columns equal to multiples of 16 so that they can be coded in accordance witha picture coding method of MPEG4. To this end, a circuit for supplementing or removing pixels is employed to supplement or remove pixels in accordance with an image size adjustment flag inputted fr om the outside.

The image size adjustment flag is in putted from the outside of the resolution frame rate conversion apparatus and is used for discrimination of whether pixels should be supplemented to or removed from an image when the pixel number in the rows or columns of the image is not a multiple of 16.

A process for an image with the image size adjustment flag is described with reference to FIG. 5. If it is assumed that the re solution of an image outputted from the MPEG2 image information decoding apparatus 4 is m×n pixels, then while both of m and n are multiples of 16, m/2 and n/2 by down sampling to ½ in the vertical and horizontal directions are multiples of 16 or have the remainder of 8 pixels when they are divided by 16. Where both of m/2 and n/2 are multiples of 16, the image complies with the MPEG4 coding system, and therefore, no processing is performed for the image. In any other case, the image does not comply with the MPEG4 cod ing system, and therefore, it is necessary to process the image with the image size adjustment flag. The image size adjustment flag provides two choices of supplementation and removal of pixels. When m/2 or n/2 is divided by 16, if the remainder is 8 pixels, then if removal of pixels is selected, then the remaining 8 pixels are removed. In other words, the resulting output image has m/2−8 or n/2−8 rows or columns. On the other hand, if supplementation of pixels is selected, the n 8 pixels produced newly, 8 pixels copied from the original image or 8 pixels suitable for the image are added to the top or the bottom of the rows or columns of the image. Therefore, the output image has m/2+8 or n/2+6 rows or columns. As a result, the horizontal and vertical resolutions of the image after the conversion become multiples of 16, and an image having a size compliant with the coding system of MPEG4 is outputted.

Referring back to FIG. 2, the inputted bit stream representative of image compression information of MPEG2 undergoes variable length decoding by the MPEG2 image information decoding apparatus 4. Further, macro block motion vectors only of P pictures and other parameters such as the macro block type are extracted from the bit stream by the MPEG2 image information decoding apparatus 4 and transmitted to a motion vector conversion apparatus 6.

A motion vector conversion method by the motion vector conversion apparatus 6 is described with reference to FIGS. 6A and 6B. Each of the squares defined by solid horizontal and vertical lines in FIGS. 6A and 6B indicates a macro block. FIG. 6A shows an image outputted from the MPEG2 image information decoding apparatus 4, that is, an image before resolution conversion. FIG. 6B shows an image obtained by converting the vertical and horizontal resolutions of the image of FIG. 6A into ½ by means of the resolution frame rate conversion apparatus 5. For example, a macro block of 16×16 pixels (h ereinafter referred to as 16×16 macro block) indicated with slanting lines at the left top corner of the image of FIG. 6A before the conversion is converted into a block of 8×8 pixels (hereinafter referred to as 8×8 block) indicated with slanting lines at the left top corner of the image of FIG. 6B. Further, four 16×16 macro blocks screened in FIG. 6A are individually converted, by resolution conversion, into four 8×8 blocks as screened in FIG. 6B, and one 16×16 macro block is formed from the four 8×8 macro blocks. Since the correlation between motion vectors before and after the resolution conversion is high, a motion vector of an 8×8 block after the conversion can be determined from a motion vector of a 16×16 macro block before the conversion. Further, a 16×16 motion block is determined from four 8×8 motion vectors. Consequently, four 8×8 motion vectors and one 16×16 motion vectors for use for coding in accordance with the image coding system of MPEG4 are produced.

A principle of operation of motion vector conversion is described with reference to FIG. 7 which shows a detailed configuration of the motion vector conversion apparatus 6 of the image information conversion apparatus of FIG. 2. Such parameters as a motion vector and an image size in the inputted bit stream representative of image compression information of MPEG2 are used to produce an 8×8 motion vector before modification by an MPEG2 16×16 motion vector to 8×8 motion vector conversion apparatus 8.

A principle of operation of the MPEG2 16×16 motion vector to 8×8 motion vector conversion apparatus 8 is described with reference to a flow chart of FIG. 8. The MPEG2 16×16 motion vector to 8×8 motion vector conversion apparatus 8 operates in the following manner based on a motion vector and a macro block type of an inputted macro block of MPEG2. Since a bit stream of interlaced scanned image compression information of MPEG2 usually uses a frame structure, a conversion method which only includes processing of a bit stream of a frame structure is described here.

In step ST-2, the MPEG2 16×16 motion vector to 8×8 motion vector conversion apparatus 8 discriminates, based on the motion vector and the macro block type of the inputted macro block of MPEG2, which one of an intra-macro block, a skip macro block and an inter-macro block the macro block is. If the macro block is an intra-macro block, then it is assumed that an 8×8 block after resolution conversion of the intra-macro block of MPEG2 has a motion vector. As processing for the intra-macro block of MPEG2, in step ST-2, the motion vector of the 8×8 block is set to 0 first, and then an intra-mode flag is provided in order to allow processing by a MPEG2 intra-macro block motion vector modifier 11 to be performed. In MPEG2, when the macro block is an intra-macro block, an intra-mode flag is set.

If the macro block otherwise is a skip macro block, then the motion vector of each block is set to 0.

A concept of motion vector conversion where the macro block is an inter-macro block and the image has a frame structure and frame prediction is used is described with reference to FIGS. 9A and 9B. FIG. 9A shows an image before resolution conversion while FIG. 9B shows the image after the resolution conversion. As described hereinabove with reference to FIGS. 3A and 3B, a horizontal component of a motion vector after conversion is determined from a horizontal component of a motion vector before the conversion and a resolution conversion rate in the horizontal direction of the image. A vertical component of the motion vector is determined from a vertical component of the motion vector before the conversion and a resolution conversion rate in the vertical direction of the image. In particular, when the resolution in the horizontal direction is converted into ½, also the horizontal component of the motion vector after the conversion becomes ½ that before the conversion. When the resolution in the vertical direction is converted into ½, also the vertical component of the motion vector after the conversion becomes ½ that before the conversion.

The motion vector (8, 12) before conversion illustrated in FIG. 9A changes to a motion vector (4, 6) after the conversion illustrated in FIG. 9B. It is to be noted that, in FIGS. 9A and 9B, the distance between middle values (half pixels) of integer pixels is represented by 1. In the image before the resolution conversion shown in FIG. 9A, each dark circle indicates the position of an integer pixel, and each rhomb indicates the position of a half pixel. In the image after the resolution conversion shown in FIG. 9B, a half pixel is indicated by a blank circle. As can be seen from FIGS. 9A and 9B, a motion vector indicated at the position of an integer pixel before conversion is indicated at the position of an integer pixel or a half pixel after the conversion, but a motion vector indicated at the position of a half pixel before the conversion does not have a pixel referred to thereby after the resolution conversion. Therefore, if a motion vector before conversion indicates the position of a half pixel, then also the motion vector after conversion is changed so as to indicate the position of a half pixel of a predictive image. Since a decoded image signal originally includes some distortion arising from quantization, if it ddis used as it is as a predictive image, then the prediction efficiency is deteriorated and may sometimes cause picture quality deterioration. In order to reduce such prediction efficiency deterioration, a half pixel accuracy wherein pixels on a reference screen which corresponds to a low-pass filter are linearly interpolated at 1:1 is sometimes selected so that the picture quality deterioration may be prevented. Accordingly, also in coding in accordance with the image coding system of MPEG4, in order to augment the prediction efficiency and prevent the picture quality deterioration, if a motion vector of MPEG4 indicates the position of a half pixel, then also upon conversion into a format of MPEG4, it is converted so that the motion vector may indicate the position of a half pixel. A corresponding relationship between motion vectors before and after conversion is illustrated in a table of FIG. 10.

FIGS. 11A and 11B illustrate a concept of motion vector conversion where an image has a frame structure and field prediction, particularly first field prediction, is used. A horizontal component of a motion vector is processed in a similar manner as in the image of FIGS. 10A and 10B. For the vertical direction, the first fields are extracted to allow conversion of the resolution into ½. Since also the prediction used is the first field prediction, a motion vector before conversion becomes a motion vector after the conversion as it is.

A concept of motion vector conversion where an image has a frame structure and second field prediction is used is illustrated in FIGS. 12A, 12B and 13. When resolution convers ion is performed, since only the first field is extracted, pixel values of the first field are used as a reference image after conversion. Therefore, temporal and spatial modification of a motion vector is performed so that pixel values of the sedcond field used as a predictive picture in MPEG2 are used for first field prediction after resolution conversion. FIGS. 12A and 12B illustrate a technique of spatial modification used to convert pixel values of second field prediction approximately into pixel values of first field prediction. FIG. 12A illustrates a motion vector before resolution conversion while FIG. 12B illustrates a motion vector after the resolution conversion. In particular, "1" is added to a vertical component of a motion vector. As can be seen from FIGS. 12A and 12B, if "1" is added to a ver tical component of a motion vector determ ined by a second field prediction, then the second field is shifted by one row distance so that it comes to a spatial position similar to that of the first field and the motion vector becomes a motion vector like a motion vector determined by first field prediction in the space. The expression (1) given below represents a vertical component of a motion vector $MV_{top}$ where the second field at a spatial position positioned at a similar position to that of the first field by spatial modification, that is, an approximate first field, is used for predi ction:

Vertical component: approximate $MV_{top}=MV_{bottom}+1$ (1)

Meanwhile, interlaced scanned image compression information of MPEG2 exhibits some displacement in time between the first field and the second field. Therefore, modification for the time displacement between the first field approximated from the second field and the actual first field is performed. FIG. 13 illustrates a temporal positional relationship of different fields. Here, if the interval between the first field and the second field is represented by 1 and the interval between the second field of an I picture and the first field of a P picture is represented by a, then the value a exhibits an odd number like 1, 3, 5, 7, . . . . It is to be no ted that, where a is 1, pictures are I, P, P, P, . . . pictures. A time modified motion vector MV' is given by the following expression (2):

Vertical component: $MV'=\{(a+1)/a\}$approximate $MV_{top}$ (2)

By substituting the expression (1) into the expression (2), the vertical component of the motion vector after the conversion is given by the following expression (3):
Vertical component:

$MV'=\{(a+1)/a\}(MV_{bottom}+1)$ (3)

It is to be noted that the horizontal component of the motion vector after the conversion can be determined by multiplying the motion vector before the conversion by (a+1)/a, performing temporal modification and then performing the calculation illustrated in the table of FIG. 10.

According to circumstances, spatial modification may be performed for the vertical component of the motion vector after the temporal modification is performed. The vertical component of the motion vector MV' in this instance is given by the expression (4) given below. It is to be noted that, if spatial and temporal modification is performed for the horizontal component (time modification is performed after spatial modification is performed), then the horizontal component exhibits a similar value to that obtained when temporal and spatial modification is performed (spatial modification is performed after temporal modification is performed).

Vertical component: $MV'=\{(a+1)/a\}MV_{bottom}+1$ (4)

The difference between the expression (3) and the expression (4), that is, the difference between the vertical components of the motion vector when spatial and temporal modification is performed and when temporal and spatial modification is performed, is 1/a. Accordingly, since the influence of the difference differs depending upon the value of a, modification methods in two cases wherein a is equal 1 and wherein a is 3, 5, 7, . . . are described.

First, a modification method where a ~1 is described. By substituting 1 into a of the expression (3), the vertical component of the motion vector is determined as given by the following expression (5):

Vertical component: $MV'=2\times(MV_{bottom}+1)$. (5)

By substituting 1 into a of the expression (4), the vertical component of the motion vector is determined as given by the following expression (6):

Vertical component: $MV'=2\times(MV_{bottom}-1)$. (6)

As a result, if 0, 1, 2, . . . are substituted into the motion vector $MV_{bottom}$ before the conversion, then such even numbers as 2, 4, 6, . . . are obtained as the value according to the expression (5). On the other hand, such odd numbers as 1, 3, 5, . . . are obtained as the value according to the expression (6). In other words, if spatial and temporal modification is performed., then irrespective of whether the motion vector before the conversion is indicated at the position of an integer pixel or at the position of a half pixel, the motion vector after the conversion comes to the position of a half pixel. Accordingly, in order to cause a motion vector, which is indicated at the position of an integer pixel before conversion, to come to the position of an integer pixel also after the conversion, spatial and temporal conversion is performed. On the other hand, in order to cause a motion vector, which is indicated at the position of a half pixel before conversion, to come to the position of a half pixel also after the conversion, temporal and spatial conversion is performed. In short, spatial modification and temporal modification are used alternately for motion vectors before conversion to convert them into motion vectors after the resolution conversion or to perform temporal and spatial modification for the motion vectors before the conversion.

After the motion vector conversion process described above comes to an end, an 8×8 motion vector of MPEG4 before modification is outputted. The 8×8 motion vector outputted is transmitted to an image size adjustment flag based motion vector adjuster 9 (FIG. 7), by which it is modified with an image size adjustment flag inputted thereto from the outside to a motion vector suitable for an image size. The resulting motion vector is outputted from the image size adjustment flag based motion vector adjuster 9.

Operation of the image size adjustment flag based motion vector adjuster 9 is described with reference to a flow chart of FIG. 14. In step ST-11, the image size adjustment flag based motion vector adjuster 9 discriminates whether both m/2 and n/2 where the input image has a size of m×n pixels are multiples of 16. If both of m/2 and n/2 are multiples of 16, then the image size adjustment flag based motion vector adjuster 9 outputs the 8×8 motion vector of MPEG4 outputted from the motion vector conversion apparatus 6 as it is without processing the same. If m/2 or n/2 is not a multiple of 16, the image size adjustment flag based motion vector adjuster 9 uses the image size adjustment flag inputted from the outside to discriminate whether or not pixels should be removed in step ST-12. If pixels should be removed, then the image size adjustment flag based motion vector adjuster 9 does not output the 8×8 motion vector of the eight pixels removed but outputs another 8×8 motion vector. If it is discriminated in step ST-12 that pixels should not be removed, then the image size adjustment flag based motion vector adjus ter 9 discriminates in step ST-13 whether or not pixels should be supplemented. If pixels should be supplemented, then the image size adjustment flag based motion vector adjuster 9 sets an 8×8 motion vector of eight pixels supplemented to 0 and outputs the motion vector of 0 together with the other inputted 8×8 motion vectors.

Referring back to FIG. 7 again, the 8×8 motion vector outputted from the image size adjustment flag based motion vector adjuster 9 and suitable for the image size is converted by an MPEG4 8×8 motion vector to MPEG4 16×16 motion vector conversion apparatus 10 or an MPEG4 8×8 motion vector to MPEG4 16×16 motion vector conversion apparatus 15 shown in FIG. 16.

The motion vector conversion apparatus 10 of FIG. 7 divides the sum of motion vectors of those of four blocks cooperatively forming a macro block which are converted from a macro block which is not an intra-macro block b the number of those blocks to calculate an average motion vector and outputs the average motion vector as a 16×16 motion vector.

This is described with reference to FIG. 16. As a first method, the MPEG4 8×8 motion vector to MPEG4 16×16 motion vector conversion apparatus 15 selects, from among 8×8 motion vectors of MPEG4 for the macro block produced by an MPEG2 16×16 motion vector to MPEG4 8×8 motion vector conversion apparatus 12, the motion vector produced from one of the pertaining macro blocks which is considered to have the highest coding efficient, and outputs the selected motion vector as a 16×16 motion vector of MPEG4.

The discrimination of the coding efficiency is performed based on information of the individual macro blocks stored in a macro block information buffer 14 and representative of image compression information of MPEG2 inputted to the image information conversion apparatus.

In short, the first method determines that one of four macro blocks which includes the least number of nonzero DCT coefficients has the highest coding efficiency. A second method determines that one of four macro blocks which includes the least number of bits allocated to DCT coefficients of brightness components has the highest coding efficiency. A third method determines that one of four macro blocks which includes the least number of bits allocated to DCT coefficients has the highest coding efficiency. A fourth method determines that one of four macro blocks which includes the least total number of bits allocated to the macro block including motion vectors and so forth has the highest coding efficiency. A fifth method determines that one of four macro blocks which has the smallest allocated quantization scale has the highest coding efficiency. A fifth method determines that one of four macro blocks which has the lowest complexity has the lowest coding efficiency. The complexity X allocated to each macro block is calculated in accordance with the following expression (7) using the quantization scale Q allocated to the macro block and the bit number B of the macro block:

$$X=Q \cdot B \tag{7}$$

where B may be the bit number allocated to the entire macro block, or may be the bit number all ocated to DCT coefficients or else may be the bit number allocated to DCT coefficien ts allocated to brightness components.

Referring back to FIG. 16, as the second method, the MPEG4 8×8 motion vector to MPEG4 16×16 motion vector conversion apparatus 15 counts, from among 8×8 motion vectors of MPEG4 for the macro blocks produced by the MPEG2 16×16 motion vector to MPEG4 8×8 motion vector conversion apparatus 12, that motion vector produced from the macro block which is considered to have the highest weight twice in an overlapping relationship, and determines that one of the totaling five 8×8 motion vectors which has a length of a middle value has the highest coding efficiency and selects and outputs the 8×8 motion vector as a 16×16 motion vector of MPEG4. Here, for the comparison in length between motion vectors, the sum of the squares of the lengths in the horizontal direction and the vertical direction is used, but a process of determining a square root is omitted.

The discrimination of the weight is performed based on information of the individual macro blocks of the bit stream stored in the macro block information buffer 14 and representative of image compression information of MPEG2 inputted to the image information conversion apparatus.

In particular, a first method determines that one of four macro blocks which includes the least number of non-zero DCT coefficients has the highest weight. A second method determines that one of four macro blocks which includes the least number of bits allocated to DCT coefficients of brightness components has the highest weight. A third method determines that one of four macro blocks which includes the least number of bits allocated to DCT coefficients has the highest weight. A fourth method determines that one of four macro blocks which includes the least total number of bits allocated to the macro block including motion vectors and so forth has the highest weight. A fifth me thod determines that one of four macro blocks which has the smallest allocated quantization scale has the highest weight. A fifth method determines that one of four macro blocks which has the lowest complexity has the lowest weight. The complexity X allocated to each macro block is calculated in accordance with the following expression (7) using the quantization scale Q allocated to the macro block and the bit number B of the macro block:

$$X=Q \cdot B \tag{8}$$

where B may be the bit number allocated to the entire macro block, or may be the bit number allocated to DCT coefficients or else may be the bit number allocated to DCT coefficients allocated to brightness components.

Referring back to FIG. 7 again, the 8×8 motion vectors suitable for the image size outputted from the image size adjustment flag based motion vector adjuster 9 are inputted to the MPEG2 intra-macro block motion vector modifier 11. The 8×8 motion vector of each block converted from a macro block which has been an intramacro block in the bit stream representative of image compression information of MPEG2 is modified by being replaced with the 16×16 motion vector determined by the MPEG4 8×8 motion vector to MPEG4 16×16 motion vector conversion apparatus 10. The 8×8 motion vectors after the modification and the 16×16 motion vector determined by the MPEG4 8×8 motion vector to MPEG4 16×16 motion vector conversion apparatus 10 are outputted as MPEG4 motion vectors.

A principle of operation of the motion vector modification is described with reference to FIG. 15 which shows a detailed configuration of the MPEG2 intra-macro block motion vector modifier 11 of FIG. 7. An 8×8 motion vector suitable for an image size is inputted to the MPEG2 intra-macro block motion vector modifier 11. When the intra-mode flag is in a set state, that is, when the macro block is an intra-macro block in the bit stream which represents image compression information of MPEG2, a movable contact m of a switch SW is connected to a fixed contact a side, and the motion vector of the 8×8 block converted from the intra-macro block is replaced by a replacement apparatus PK with the 16×16 motion vector determined by the MPEG4 8×8 motion vector to MPEG4 16×16 motion vector conversion apparatus 10. In this instance, the motion vector of the 8×8 block may alternatively be replaced with a motion vector converted from a motion vector of an inter-macro block present around the intra-macro block, or otherwise may be replaced with a motion vector converted from a motion vector of an inter-macro block which is nearest to the intra-macro block. It is to be noted that, if all of the four blocks are converted from intra-macro block s, the four motion vectors become 0, and also the 16×16 motion vector determined by the MPEG4 8×8 motion vector to MPEG4 16×16 motion vector conversion apparatus 10 becomes 0. Therefore, the motion vector to be used for image coding of MPEG4 becomes 0, and the macro-block type becomes the intra-mode type. On the other hand, when the intra-mode flag is not in a set state, that is, when no intra-macro block of MPEG2 is involved, the movable contact m of the switch SW is connected to another fixed contact b side, and the 8×8 motion vector inputted is outputted as it is.

Now, a re-search of a produced motion vector is described. A concept of motion vector conversion of an inter-macro block where an image has a frame structure and field prediction is used is illustrated in FIGS. 17A and 17B. FIG. 17A shows a motion vector before resolution conversion while FIG. 17B shows the motion vector after the resolution conversion. As described hereinabove with reference to FIGS. 3A and 3B, the horizontal component of a motion vector after conversion can be determined from the horizontal component of the motion vector before conversion and a resolution conversion rate in the horizontal direction of the image. The vertical component can be determined from the vertical component of the motion vector before the conversion and the resolution conversion rate in the vertical direction of the image.

In other words, if the resolution in the horizontal direction is converted into ½, then also the vertical component of the motion vector after the conversion becomes ½ that before the conversion. The motion vector illustrated in FIGS. 9A and 9B changes, for example, from (8, 12) before conversion to (4, 6) after the conversion. It is to be noted that, in this instance, the distance between middle values (half pixels) of integer pixels is represented by 1. Before the resolution conversion of FIG. 17A, each dark circle indicates the position of an integer pixel, and each rhomb indicates the position of a half pixel.

As can be seen from FIGS. 17A and 17B, a motion vector indicated at the position of an integer pixel before the conversion is indicated at the position of an integer pixel or a half pixel after the conversion, but a motion vector indicated at the position of a half pixel before the conversion does not have a pixel to be referred to after the resolution conversion. Therefore, where a motion vector before conversion indicates the position of a half pixel, the motion vector after the conversion is modified so that it also indicates the position of the nearest integer pixel of a predictive image. This is intended to make the center pixel of a search window coincide with an integer pixel when pixels around the motion vector are re-searched in later motion vector modification. First, that one of motion vectors of integer pixels in a search window which exhibits the smallest prediction error is determined, and then half pixel values around the integer pixel are searched thereby to reduce the number of processing steps. A correspondence relationship between motion vectors before and after conversion is illustrated in FIGS. 19A and 19B.

Alternatively, it is possible to produce a half pixel motion vector and perform a re-search around the half pixel as seen in FIGS. 9A, 9B, 10, 11A, 11B, 12A and 12B. In this instance, however, a step of determining the half pixel value in the search window in advance is required, resulting in increase of the number of processing steps.

Now, a concept of motion vector conversion of an inter-macro block where an image has a frame structure and first field prediction is used as the field prediction is illustrated in FIGS. 19A and 19B. FIG. 19A illustrates a motion vector before resolution conversion while FIG. 19B illustrates the motion vector after the resolution conversion. For the horizontal component of a motion vector, a process similar to that described hereinabove with reference to FIG. 18 is performed. For the vertical component of the motion vector, the first fields are extracted to allow conversion of the resolution into ½. Further, since first field prediction is performed as the prediction, a motion vector before the conversion becomes a motion vector after the conversion as it is.

A concept of motion vector conversion of an intermacro block where second field prediction is used is illustrated in FIGS. 20A and 20B. FIG. 20A illustrates a motion vector before resolution conversion while FIG. 20B illustrates the motion vector after the resolution conversion. Since only the first fields are extracted upon resolution conversion, after the conversion, pixel values of the first fields are used as reference images. Field line modification and motion vector modification in the temporal direction are performed by a method similar to that described hereinabove with reference to FIGS. 12A and 12B, and thereafter, processing similar to that of FIG. 18 is performed for the pixel values in the horizontal direction as seen from integer pixels after the conversion.

Now, a motion vector modification process by a research is described with reference to FIG. 21. In particular, the motion vector modification apparatus receives a motion vector scaled by the motion vector conversion apparatus 6 of FIG. 2 and outputs a motion vector modified through a re-search in order to raise the coding efficiency. Further, the motion vector modification apparatus sets a size of a search window in accordance with a motion vector modification direction information flag. The motion vector modification direction information flag is hereinafter described with reference to FIGS. 23, 24A and 24B.

In particular, the motion vector modification apparatus performs a re-search to modify a distortion caused by scaling of a motion vector by the motion vector conversion apparatus 6 in order to determine a motion vector with a higher degree of accuracy. First, the motion vector modification apparatus performs a motion vector search of ±2 integer pixels in the horizontal direction and ±1 pixel in the vertical direction around an 8×8 motion vector of MPEG4 inputted thereto. Consequently, the search window centered at the motion vector determined by the motion vector conversion apparatus 6 can be suppressed horizontally to 5 pixels and vertically to 3 pixels thereby to reduce the processing number of the motion vector search significantly. Although the search window is set horizontally to 5 pixels and vertically to 3 pixels as just described, the search pixel numbers of the window in the horizontal and vertical directions need not be limited to them and can be selected arbitrarily. In order to reduce the search processing number, a motion vector modification direction information flag hereinafter described may be used to set the size of the search window for modification of a motion vector asymmetrically in the forward and reverse directions.

FIG. 22 shows a configuration of the motion vector conversion apparatus (related art apparatus which was not known when the present application was filed in Japan). The motion vector conversion apparatus is similar to the motion vector conversion apparatus 6 shown in FIG. 2. First, a conversion apparatus 221 performs spatial and temporal modification of a motion vector described hereinabove to produce an 8×8 motion vector. Then, a search apparatus 222 performs a re-search process of an 8×8 motion vector with regard to the 8×8 motion vector as described above. For example, the search apparatus 222 performs a search, for example, with a search window with two integer pixels in the horizontal and vertical directions around the reference destination of the produced 8×8 motion vector. Consequently, the prediction accuracy of the 8×8 motion vector can be improved. Then, prediction errors re-searched individually with regard to the four 8×8 motion vectors which form one macro block and the 8×8 motion vectors for which the re-search process has been performed are inputted to a conversion apparatus 223.

The conversion apparatus 223 discriminates that one of the four 8×8 motion vectors which exhibits the smallest prediction error among the prediction errors determined upon the re-search for an 8×8 motion vector, and allocates the discriminated motion vector to a 16×16 motion vector. Then, a search apparatus 224 performs a re-search process for the produced 16×16 motion vector in a similar manner as described above to improve the prediction accuracy of the 16×16 motion vector. Thus, the 8×8 motion vectors and the 16×16 motion vector of MPEG4 are produced and outputted.

The 8×8 motion vectors and the 16×16 motion vector outputted are inputted to a half pixel search apparatus 225, from which 8×8 and 16×16 motion vectors of the half pixel accuracy are outputted.

Here, the motion vector modification direction information flag mentioned hereinabove with reference to FIGS. 21 and 22 is described with reference to FIGS. 23A, 23B and 24. The motion vector modification apparatus sets a size of a re-search window in the advancing direction of a motion vector with the motion vector modification direction information flag. First, if the MPEG2 motion vector before conversion is an integer pixel and also the MPEG4 motion vector after conversion has an integer pixel value as seen in FIG. 23A, since a pixel of the same phase is present and no distortion occurs with the pixel value of the motion vector, a search window for motion vector modification is set symmetrically in the advancing direction of the motion vector. However, if the MPEG2 motion vector before conversion has an integer pixel value and the MPEG4 motion vector after the conversion has a half pixel accuracy as seen in FIG. 23B, in order to modify it to an approximate integer pixel value of MPEG4 by carrying up in the advancing direction of the motion vector, the search window is set so as to have a greater part in the reverse direction to the advancing direction of the motion vector thereby to reduce the search processing number. For example, a search is performed with two integer pixel values in the reverse direction to the motion vector and with one integer pixel value in the forward direction. Naturally, if the motion vector of MPEG4 is set to an appropriate integer pixel value of MPEG4 by carrying down upon motion vector conversion, then the search window is set so as to be greater in the forward direction with respect to the advancing direction of the motion vector.

Also in FIGS. 24A and 24B, the MPEG2 motion vector before conversion exhibits a half pixel accuracy. Upon conversion into an MPEG motion vector, in order to modify the motion vector to the nearest integer pixel value of MPEG4, the search window of the MPEG4 motion vector modification apparatus can be set, based on the direction in which a distortion occurs, so as to be greater in the forward direction or the reverse direction with respect to the advancing direction of the motion vector similarly as in the case of FIG. 23B. Consequently, in order to reduce the processing number for motion vector re-search, the direction of the distortion of the motion vector is outputted from the motion vector conversion apparatus 6 and inputted to the motion vector modification apparatus, by which a size of a search window optimum to perform a modification search for a motion vector can be set.

The MPEG4 image information coding apparatus 7 receives an output image from the resolution frame rate conversion apparatus 5, performs coding of the output image in accordance with an image coding system of MPEG4 using the motion vector of MPEG4 outputted from the motion vector conversion apparatus 6, and outputs a bit stream representative of image compression information of MPEG4.

In the following, a different motion vector conversion method and conversion apparatus (which was not known when the present application was filed in Japan) invented by the inventors of the invention of the present application is described.

FIG. 25 illustrates a concept of a correspondence relationship between a picture type and a VOP (Video Object Plane) type upon conversion from an MPEG2 stream into an MPEG4 stream. When a stream of MPEG2 of 30 frames per second wherein the GOP (Group Of Pictures) structure is N15M3 is to be converted into another stream of MPEG4 of 5 frames per second wherein the GOP structure is N5M1, every other ones of I and P frames are converted into MPEG4 frames. Since one GOP of N5M1 of the stream of MPEG4 corresponds to two GOPs of N15M1 of the stream of MPEG2 as seen in FIG. 25, upon conversion from MPEG2 into MPEG4, two cases are available including a case wherein a P frame is dropped and another case wherein an I frame is dropped.

First, dropping of an I frame is described with reference to FIG. 26. Since an I frame $I_{n-1}$ between P frames $P_{n-2}$ and $P_n$ does not include any motion vector, the motion vector of the dropped I frame cannot be added to the motion vector $MV_n$ of the pertaining macro block to synthesize a motion vector. Therefore, in the pertaining macro block, the motion vector $MV_n$ of the macro block is spatially and temporally modified by scaling in accordance with the method described hereinabove in the description of the related art, and then the length of the motion vector $MV_n$ in the temporal direction is extended twice so as to refer to a VOP of MPEG4 converted from an I or P frame preceding to the dropped P frame to obtain a motion vector $2*MV_n$. Consequently, the VOP converted from the I or P frame immediately precedes the frame whose motion vector of the P-VOP is referred to. In this manner, scaling by spatial and temporal modification is performed, and then, a motion vector extended to twice in the temporal direction is produced and outputted as an 8×8 motion vector.

Now, dropping of a P frame is described with reference to FIGS. 27, 28, 29 and 30. Referring first to FIG. 27, there is illustrated a concept of a process when a P frame is dropped. Since a P frame $P_{n-1}$ to be dropped between an I frame $I_{n-2}$ and a P frame $P_n$ has a motion vector $MV_{n-1}$, the motion vector $MV_{n-1}$ of the P frame to be dropped is added to the motion vector MVn of the pertaining macro block to produce a motion vector $MV_{n-1}+Mv_{n1}$ which refers to the frame preceding to the P frame to be dropped.

As shown in FIG. 28, a motion vector of the pertaining macro block refers to the frame to be dropped, and in this case, the pertaining reference area overlaps with a plurality of macro blocks to be referred to.

FIG. 29 illustrates in what manner the area $MB_0$ for reference overlaps with a plurality of macro blocks. As can be seen from FIG. 29, the area $MB_0$ for reference may possibly overlap with one, two or four macro blocks (MB). The portions at which the area $MB_0$ for reference overlaps with the macro blocks MB are denoted by refMB#0, refMB#1, refMB#2 and refMB#3. Motion vectors, macro block modes and prediction modes, bit numbers or quantization scales of the P frame to be dropped are stored in a unit of a frame into a motion vector and macro block information buffer in order to allow later synthesis of motion vectors by addition. With regard to the pertaining macro block for which motion vector conversion from MPEG2 to MPEG4 is to be performed, coordinates to be referred to by the motion vector on the dropped P frame are calculated. As seen from FIG. 29, depending upon the coordinates referred to by the motion vector, the macro block $MB_0$ for reference may possibly overlap with one, two or four macro blocks (MB) of the reference P frame dropped. Where the macro block $MB_0$ for reference overlaps with a plurality of macro blocks, the coding efficiencies of the macro blocks are re-arranged in a descending order based on a parameter X determined in advance.

In particular, in a first method, the parameter X is the "number of pixels in each of the portions, overlapping with the macro block in the P frame next to the P frame to be dropped, of macro blocks in the P frame to be dropped"; in a second method, the parameter X is the "number of pixels in each of the portions, overlapping with the macro block in the P frame next to the P frame to be dropped, of macro blocks in the P frame to be dropped/macro block bit number"; in a third method, the parameter X is the "number of pixels in each of the portions, overlapping with the macro block in the P frame next to the P frame to be dropped, of macro blocks in the P frame to be dropped/Q-scale" (the Q scale signifies a macro block quantization scale); in a fourth method, the parameter X is the "number of pixels in each of the portions, overlapping with the macro block in the P frame next to the P frame to be dropped, of macro blocks in the P frame to be dropped/(macro block bit number×Q-scale"; in a fifth method, the parameter X is 1/macro block bit number; in a sixth method, the parameter X is the (1/Qscale); and in a seventh method, the parameter X is 1/(macro block bit number×Q-scale). The highest one of the values of the parameter X is determined as a maximum value, and the lowest one of the values of the parameter X is determined as a minimum value. In FIG. 28, the parameters X according to the first to fourth methods described above are illustrated. In FIG. 28, "$MB_{overlapped\ area}$" denotes the number of pixels in each of the portions, overlapping with the macro block in the P frame next to the P frame to be dropped, of macro blocks in the P frame to be dropped"; "Coef bits" denotes the macro bit number; and "Q-scale" denotes the macro block quantization scale.

Now, a motion vector synthesis algorithm where a P frame is dropped is described with reference to a flow chart of FIG. 30. First, from among one, two or four macro blocks (MB) in the P frame to be dropped, which overlap with an MPEG2 motion vector of the pertaining area in order to be referred to, those in which the macro block (MB) mode is Not Coded (whose DCT coefficients are not coded) and a number of pixels in the overlapping macro block is greater than a threshold value T are searched for (step ST-21). The threshold value T is set, for example, to 100 pixels. If at least one macro block (MB) of Not Coded is included in the overlapping macro blocks, then the motion vector $MV_{n-1}$ of the macro block (MB) of Not Coded having the lowest macro block (MB) address is selected (step ST-22).

If a macro block of Not Coded (whose DCT coefficients are not coded) is not included in the one, two or four macro blocks in the P frame to be dropped, which overlap with the MPEG2 motion vector of the pertaining area in order to be referred to, then macro blocks in which the macro block (MB) mode is No MC (no motion compensation) and a number of pixels in the overlapping macro block is greater than the threshold value T are searched for (step ST-23). The threshold value T is set, for example, to 100 pixels. If at least one macro block of No MC is included in the overlapping macro blocks, then the motion vector $MV_{n-1}$ of the macro blocks of No MC having the lowest macro block address is selected (step ST-24).

If a macro block of Not Coded (whose DCT coefficients are not coded) or No MC (No motion compensation) is not included in the one, two or four macro blocks which overlap with the MPEG2 motion vector of the pertaining macro block in order to be referred to, then it is discriminated in order beginning with the macro block which has the maximum parameter X described above whether or not the macro block (MB) mode of each of the macro blocks is an intra-macro block (MB (step ST-25). If the reference macro block is an intra-macro block, then it is discriminated whether or not the macro block which has the second maximum parameter X is an intramacro block and it is discriminated whether or not all of the macro blocks which overlap with the pertaining macro block are intra-macro blocks in order to be referred to (step ST-26). If all of the macro blocks which overlap with the pertaining macro block in order to be referred to are intra-macro blocks, then a zero motion vector (MV) is selected (step ST-27).

If a macro block which is not an intra-macro block is searched out in step ST-25, then the processing advances to a next discrimination routine. In particular, it is discriminated whether or not the prediction mode of the macro block which is not an intra-macro block is field prediction wherein the second field is referred to (step ST-28). If the field prediction wherein the second field is referred to is used, then similar discrimination is performed for the reference block which has the second maximum parameter X (step ST-29). If N (the number of intra-macro blocks) reference macro blocks use the field prediction wherein the second field is referred to, then the motion vector $MV_{n-1}$ of the reference macro block (MB) which has the highest parameter X (step ST-30) is selected. N is a number determined in advance and has the value of 1, 2, 3 or 4. If a macro block which does not use the field prediction wherein the second field is referred to is searched out, then the motion vector $MV_{n-1}$ of the macro block is selected (step ST-31). A motion vector to be added to the motion vector of the pertaining macro block is selected in this manner.

FIG. 31 illustrates temporal modification of a motion vector which refers to the second field. Scaling (resolution conversion) of the motion vector obtained by the addition is performed in accordance with a method similar to the scaling method wherein spatial and temporal modification is performed for a motion vector described hereinabove in the description of the related art. Consequently, if the motion vector obtained by the addition refers to the second field of the reference frame, then field modification is performed for the vertical component of the motion vector, and then the motion vector is extended by an amount equal to one field distance in the temporal direction as vector modification. As seen in FIG. 31, the field distance between the pertaining field and the second field to be referred to is denoted by a, and therefore, the motion vector is multiplied by (a+1)/a in order to temporally modify the same for one field. An 8×8 motion vector is determined in this manner and outputted.

FIG. 32 shows a configuration of a motion vector conversion apparatus which drops an I frame. Referring to FIG. 32, the motion vector conversion apparatus is similar to the motion vector conversion apparatus 6 described hereinabove with reference to FIG. 2. First, motion vectors of MPEG2 are inputted to a motion vector spatial-temporal modification apparatus 321, by which spatial and temporal modification of the motion vectors is performed in a similar manner as described hereinabove to produce 8×8 motion vectors. Then, the 8×8 motion vectors are inputted to an 8×8 MV re-search apparatus 322, in which a re-search process for 8×8 motion vectors is performed as described hereinabove in the description of the related art. For example, a search window centered at a reference destination of each of the produced 8×8 motion vectors is produced with two integer pixels in the horizontal and vertical directions, and a search is performed within the search window. Consequently, the prediction accuracy of the 8×8 motion vector can be improved. Then, prediction errors researched with regard to four 8×8 motion vectors which form one macro block and the 8×8 motion vectors for which the re-search process has been performed are inputted to an 8×8 MV to 16×16 MV conversion apparatus 323.

The 8×8 MV to 16×16 MV conversion apparatus 323 discriminates that one of the four 8×8 motion vectors which has the lowest prediction error and allocates the discriminated motion vector to the 16×16 motion vector. Then, the produced 16×16 motion vector is inputted to a 16×16 MV re-search apparatus 324, by which a re-search process is performed similarly as described in the description of the related art to improve the prediction accuracy of the 16×16 motion vector. The 8×8 motion vectors and the 16×16 motion vector of MPEG4 produced in this manner are outputted.

FIG. 33 shows a further configuration of the motion vector conversion apparatus wherein a P frame is dropped. Referring to FIG. 33, the motion vector conversion apparatus shown is similar to the motion vector conversion apparatus 6 described hereinabove with reference to FIG. 2. First, motion vectors of MPEG2 are inputted to a changeover switch 351. The changeover switch 351 is switched to an MV and MB information buffer 352 side when information of a P frame to be dropped is received, but is switched to a reference MB address calculation apparatus 354 and a motion vector extension spatial-temporal modification apparatus 357 side when information of any other P frame is received.

The MV and MB information buffer 352 stores motion vector information and macro block prediction modes of P frames to be dropped in a unit of a frame and, according to circumstances, stores the bit amount and the quantization scale of each of the macro blocks. The reference MB address calculation apparatus 354 accepts motion vectors of a P frame next to a P frame to be dropped and calculates a reference position of each of the motion vectors. The reference position of the motion vector is inputted to an addition motion vector discrimination apparatus 353, by which macro blocks of the P frame to be dropped which overlap with the reference pixel are calculated based on the reference position. The addition motion vector discrimination apparatus 353 makes use of this information to perform processing based on such a technique of selecting a motion vector to be added as described above, and outputs a motion vector to be added. The outputted motion vector is added to the motion vector of the pertaining macro block to produce a synthesized motion vector. Motion vectors synthesized in this manner are inputted to a motion vector spatial-temporal modification apparatus 355, by which spatial and temporal modification scaling is performed for the motion vectors in a similar manner as described hereinabove in the description of the related art and in the paragraphs given hereinabove to produce 8×8 motion vectors. the motion vector extension spatial-temporal modification apparatus 357 and a motion vector re-search apparatus 358 are used to determine a motion vector in accordance with the extension method and perform processes similar to those of the motion vector spatial-temporal modification apparatus 321 and the 8×8 motion vector re-search apparatus 322, respectively. Consequently, motion vectors are produced by them. The motion vectors outputted from the motion vector re-search apparatus 356 and the motion vector re-search apparatus 358 are inputted to an 8×8 motion vector selection apparatus 359. The 8×8 motion vector selection apparatus 359 outputs those of the motion vectors from the motion vector re-search apparatus 356 and the motion vector re-search apparatus 358 which have smaller predictive residuals as 8×8 motion vectors. An 8×8 MV to 16×16 MV conversion apparatus 60 and a 16×16 motion vector re-search apparatus 361 operate similarly to the 8×8 MV to 16×16 MV conversion apparatus 323 and 16×16 MV re-search apparatus 324 of the motion vector conversion apparatus of FIG. 32, respectively, to produce a 16×16 motion vector. The 8×8 motion vectors and the 16×16 motion vector of MPEG4 produced in this manner are outputted.

In this manner, when a P frame is dropped, two different kinds of motion vectors including motion vectors determined by extension of motion vectors of four blocks which form one macro block and a motion vector determined by addition of the motion vectors. A re-search process is performed subsequently for the motion vectors and a motion vector which exhibits the smallest prediction error is outputted as an 8×8 motion vector of MPEG4. The method of the re-search may be similar to the method described hereinabove in the description of the related art, and, for example, the range of search of the search window is two integer pixels in the vertical and horizontal directions. Consequently, two motion vectors can be determined by a re-search for each of four blocks which form one macro block.

Then, prediction errors of the two motion vectors for one block are compared with each other, and one of the motion vectors which exhibits the lower predictive residual is outputted as an 8×8 motion vector. In this manner, between motion vectors determined by the method wherein a motion vector is extended and the method wherein motion vectors are added, the motion vector which has the highest coding efficiency can be selected to produce an 8×8 motion vector. Thereafter, prediction errors determined by a re-search of the four 8×8 motion vectors of MPEG4 of a macro block are compared with one another to discriminate the 8×8 motion vector which exhibits the smallest prediction error. The 8×8 motion vector which exhibits the smallest prediction error is allocated to a 16×16 motion vector. Then, a re-search is performed also for the selected 16×16 motion vector similarly as in the 8×8 motion vector re-search method described hereinabove to optimize the coding efficiency of the 16×16 motion vector.

In this manner, in a procedure wherein image information compression information of MPEG2 is inputted to determine 8×8 and 16×16 motion vectors of MPEG4, the motion vector conversion apparatus extends or adds the motion vectors and performs motion vector modification by a re-search of the scaled motion vector information centered at each of the motion vectors. Consequently, a reduction in coding efficiency of an image coding apparatus of MPEG4 can be minimized.

FIG. 34 shows a yet further configuration of the motion vector conversion apparatus. Referring to FIG. 34, the motion vector conversion apparatus shown is similar to the motion vector conversion apparatus 6 described hereinabove with reference to FIG. 2. First, an MPEG4 to MPEG2 8×8 MV conversion apparatus 271 performs spatial and temporal modification of motion vectors described above to produce 8×8 motion vectors. Then, a motion vector integer pixel search apparatus 272 performs a research process for each of the 8×8 motion vectors as described hereinabove in the description of the related art. For example, a search window centered at a reference destination of each of the produced 8×8 motion vectors is produced with two integer pixels in the horizontal and vertical directions, and a search is performed within the search window. Consequently, the prediction accuracy of the 8×8 motion vector can be improved. Then, prediction errors re-searched with regard to four 8×8 motion vectors which form one macro block and the 8×8 motion vectors for which the re-search process has been performed are inputted to an 8×8 motion vector to 16×16 motion vector conversion apparatus 273.

The 8×8 motion vector to 16×16 motion vector conversion apparatus 273 discriminates that one of the four 8×8 motion vectors which has the lowest prediction error among the prediction errors determined upon the 8×8 motion vector re-search and allocates the discriminated motion vector to the 16×16 motion vector. Then, the produced 16×16 motion vector is inputted to a motion vector integer pixel search apparatus 274, by which a research process is performed similarly as described hereinabove in the description of the related art to improve the prediction accuracy of the 16×16 motion vector. The 8×8 motion vectors and the 16×. 16 motion vector of MPEG4 produced in this manner are outputted.

The 8×8 motion vectors and the 16×16 motion vector of MPEG4 outputted are inputted to a half pixel search apparatus 275, from which the 8×8 and 16×16 motion vectors are outputted with a half pixel accuracy.

In this manner, in a procedure wherein image information compression information of MPEG2 is inputted to determine 8×8 motion vectors and 16×16 motion vectors of MPEG4, the motion vector conversion apparatus extends or adds the motion vectors and performs motion vector modification by a re-search of the scaled motion vector information centered at each of the motion vectors. Consequently, a reduction in coding efficiency of an image coding apparatus of MPEG4 can be minimized.

The motion vector conversion apparatus described hereinabove with reference to FIG. 34 converts a motion vector of MPEG2 to produce a motion vector of MPEG4. However, when it converts a motion vector of an intraframe of MPEG2 into a motion vector of MPEG4, it does not produce motion vector information but converts the motion vector of an intra-frame of MEPG2 into an I-VOP of MPEG4 (the I-VOP signifies a frame coded in the intra-mode of MPEG4). Consequently, the motion vector conversion apparatus has a problem in that the I-VOP distance of a bit stream of MPEG4 is so small that the coding efficiency after conversion into image compression information of MPEG4 (the bit stream) is deteriorated.

SUMMARY OF THE INVENTION

It is an object of the present invention to provide a motion vector conversion method for an image information conversion method wherein a bit stream representative of interlaced scanned image compression information of MPEG2 is inputted and another bit stream representative of progressively scanned image compression information of MPEG4 is outputted, by which the coding efficiency in image coding of MPEG4 in the image information conversion method can be further augmented.

It is another object of the present invention to provide a motion vector conversion apparatus for an image information conversion apparatus wherein a bit stream representative of interlaced scanned image compression information of MPEG2 is inputted and another bit stream representative of progressively scanned image compression information of MPEG4 is outputted, by which the coding efficiency in image coding of MPEG4 in the image information conversion method can be further augmented.

In order to attain the objects described above, according to an aspect of the present invention, there is provided a motion vector conversion method for an image information conversion method wherein a bit stream representative of interlaced scanned image compression information of MPEG2 is inputted and a bit stream representative of progressively scanned image compression information of MPEG4 is outputted, comprising the steps of successively accepting 16×16 motion vectors of MPEG2 of the inputted bit stream representative of image compression information of MPEG2, and successively producing 8×8 motion vectors of MPEG4 and 16×16 motion vectors of MPEG4 based on the 16×16 motion vectors of MPEG2 such that every other one of P frames of the bit stream of MPEG2 is dropped to produce a bit stream of MPEG4 of a reduced frame rate and a low bit rate, the successively producing step serving also as a motion vector modification step and including a step of storing information of each of macro blocks and between blocks in the inputted bit stream representative of image compression information of MPEG2 in advance, a step of duplicating motion vectors of a P frame immediately preceding to each P frame to be dropped based on the stored information and a step of extending the duplicated motion vectors to twice in the temporal direction to produce motion vectors of MPEG4 converted from an intraframe of MPEG2.

In the motion vector conversion method, 16×16 motion vectors of MPEG2 of the inputted bit stream representative of image compression information of MPEG2 are successively accepted, and 8×8 motion vectors of MPEG4 and 16×16 motion vectors of MPEG4 are successively produced based on the 16×16 motion vectors of MPEG2 such that every other one of P frames of the bit stream of MPEG2 is dropped to produce a bit stream of MPEG4 of a reduced frame rate and a low bit rate. Also for motion vector modification, information of each of macro blocks and between blocks in the inputted bit stream representative of image compression information of MPEG2 is stored in advance, and motion vectors of a P frame immediately preceding each P frame to be dropped are duplicated based on the stored information. Then, the duplicated motion vectors are extended to twice in the temporal direction to produce motion vectors of MPEG4 converted from an intra-frame of MPEG2.

According to another aspect of the present invention, there is provided a motion vector conversion method for an image information conversion method wherein a bit stream representative of interlaced scanned image compression information of MPEG2 is inputted and a bit stream representative of progressively scanned image compression information of MPEG4 is outputted, comprising the steps of successively accepting 16×16 motion vectors of MPEG2 of the inputted bit stream representative of image compression information of MPEG2, and successively producing 8×8 motion vectors of MPEG4 and 16×16 motion vectors of MPEG4 based on the 16×16 motion vectors of MPEG2 such that every other one of I frames and P frames of the bit stream of MPEG2 is dropped to produce a bit stream of MPEG4 of a reduced frame rate and a low bit rate, the successively producing step including a step of utilizing, as a parameter for discrimination of the coding efficiency of a motion vector of MPEG4 converted from an intra-frame of MPEG2, motion vector information of each of macro blocks and between blocks of the inputted bit stream representative of image compression information of MPEG2 converted immediately preceding to the intra-frame to compare the motion vector information with a prediction value of the 0 motion vector to select one of the motion vectors which exhibit a comparatively small prediction residual as a motion vector having a comparatively high coding efficiency.

According to a further aspect of the present invention, there is provided a motion vector conversion method for an image information conversion method wherein a bit stream representative of interlaced scanned image compression information of MPEG2 is inputted and a bit stream representative of progressively scanned image compression information of MPEG4 is outputted, comprising the steps of successively accepting 16×16 motion vectors of MPEG2 of the inputted bit stream representative of image compression information of MPEG2, and successively producing 8×8 motion vectors of MPEG4 and 16×16 motion vectors of MPEG4 based on the 16×16 motion vectors of MPEG2 such that every other one of I frames and P frames of the bit stream of MPEG2 is dropped to produce a bit stream of MPEG4 of a reduced frame rate and a low bit rate, the successively producing step serving also as a motion vector modification step and including a step of successively accepting 8×8 motion vectors of MPEG4 converted by a motion vector conversion method from motion vectors of MPEG2 based on motion vector information in the inputted bit stream representative of image compression information of MPEG2, a step of performing a re-search for a motion vector centered at each of the input motion vector values to modify the motion vector, and a step of allocating that one of each four 8×8 motion vectors of MPEG4 cooperatively forming a macro block which exhibits the lowest prediction residual to a 16×16 motion vector to produce the 16×16 motion vector.

With the motion vector conversion methods, a further high coding efficiency in image coding of MPEG4 in an image information conversion method can be achieved.

According to a still further aspect of the present invention, there is provided a motion vector conversion apparatus for an image information conversion apparatus wherein a bit stream representative of interlaced scanned image compression information of MPEG2 is inputted and a bit stream representative of progressively scanned image compression information of MPEG4 is outputted, comprising motion vector production means for accepting 16×16 motion vectors of MPEG2 of the inputted bit stream representative of image compression information of MPEG2 and successively producing 8×8 motion vectors of MPEG4 and 16×16 motion vectors of MPEG4, dropping means for dropping every other one of P frames of the inputted bit stream of MPEG2 and supplying 16×16 motion vectors of MPEG2 of the remaining I frames and P frames to the motion vector production means so that a bit stream of MPEG4 of a reduced frame rate and a low bit rate may be produced by the motion vector production means, and storage means serving also as a motion vector modification apparatus for storing information of each of macro blocks and between blocks in the inputted bit stream representative of image compression information of MPEG2 in advance, the motion vector production means being operable to duplicate motion vectors of a P frame immediately preceding each P frame to be dropped based on the information stored in the storage means and extend the duplicated motion vectors to twice in the temporal direction to produce motion vectors of MPEG4 converted from an intra-frame of MPEG2.

According to a yet further aspect of the present invention, there is provided a motion vector conversion apparatus for an image information conversion apparatus wherein a bit stream representative of interlaced scanned image compression information of MPEG2 is inputted and a bit stream representative of progressively scanned image compression information of MPEG4 is outputted, comprising motion vector production means for accepting 16×16 motion vectors of MPEG2 of the inputted bit stream representative of image compression information of MPEG2 and successively producing 8×8 motion vectors of MPEG4 and 16×16 motion vectors of MPEG4, dropping means for dropping every other one of I frames and P frames of the inputted bit stream of MPEG2 and supplying 16×16 motion vectors of MPEG2 of the remaining I frames and P frames to the motion vector production means so that a bit stream of MPEG4 of a reduced frame rate and a low bit rate may be produced by the motion vector production means, and selection means utilizing, as a parameter for discrimination of the coding efficiency of a motion vector of MPEG4 converted from an intra-frame of MPEG2, motion vector information of each of macro blocks and between blocks of the inputted bit stream representative of image compression information of MPEG2 converted immediately preceding to the intra-frame to compare the motion vector information with a prediction value of the 0 motion vector to select that one of the motion vectors which exhibit a comparatively small prediction residual as a motion vector having a comparatively high coding efficiency.

According to a yet further aspect of the present invention, there is provided a motion vector conversion apparatus for an image information conversion apparatus wherein a bit stream representative of interlaced scanned image compression information of MPEG2 is inputted and a bit stream representative of progressively scanned image compression information of MPEG4 is outputted, comprising motion vector production means for accepting 16×16 motion vectors of MPEG2 of the inputted bit stream representative of image compression information of MPEG2 and successively producing 8×8 motion vectors of MPEG4 and 16×16 motion vectors of MPEG4, and dropping means for dropping every other one of I frames and P frames of the inputted bit stream of MPEG2 and supplying 16×16 motion vectors of MPEG2 of the remaining I frames and P frames to the motion vector production means so that a bit stream of MPEG4 of a reduced frame rate and a low bit rate may be produced by the motion vector production means, the motion vector production means serving also as a motion vector modification apparatus and operable to successively accept 8×8 motion vectors of MPEG4 converted by a motion vector conversion apparatus from motion vectors of MPEG2 based on motion vector information in the inputted bit stream representative of image compression information of MPEG2, perform a research for a motion vector centered at each of the input motion vector values to modify the motion vector, and allocate one of each four 8×8 motion vectors of MPEG4 cooperatively forming a macro block which exhibits the lowest prediction residual to a 16×16 motion vector to produce the 16×16 motion vector.

With all of the motion vector conversion apparatus, a further high coding efficiency in image coding of MPEG4 in an image information conversion method can be achieved.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 10 is a table illustrating handling after conversion into an MPEG4 8×8 motion vector of a motion vector of a half pixel accuracy in a bit stream representative of image compression information of MPEG2 illustrated in FIG. 9;

FIGS. 11A and 11B are diagrammatic views illustrating motion vector conver sion wh erein the image illustrated in FIG. 9 has a frame structure and first field prediction is used;

FIGS. 12A and 12B are diagrammatic views illustrating motion vector conversion wherein the image illustrated in FIG. 9 has a frame structure and second field prediction is used;

FIG. 18 is a table illustrating handling after conversion into an MPEG4 8×8 motion vector of a motion vector of a half pixel accuracy in a bit stream representative of image compression information of MPEG2 when a motion vector re-search is performed in the motion vector conversion apparatus of FIG. 7;

FIGS. 20A and 20B are diagrammatic views illustrating a concept of motion vector conversion wherein the image when a motion-vector re-search is performed by the motion vector conversion apparatus of FIG. 7 has a frame structure and second field prediction is used;

FIG. 25 is a diagrammatic view illustrating dropping of an I frame;

FIG. 31 is a diagrammatic view illustrating temporal modification of a motion vector wherein the second field of a motion vector is referred to;

DESCRIPTION OF THE PREFERRED EMBODIMENT

Figure 35:
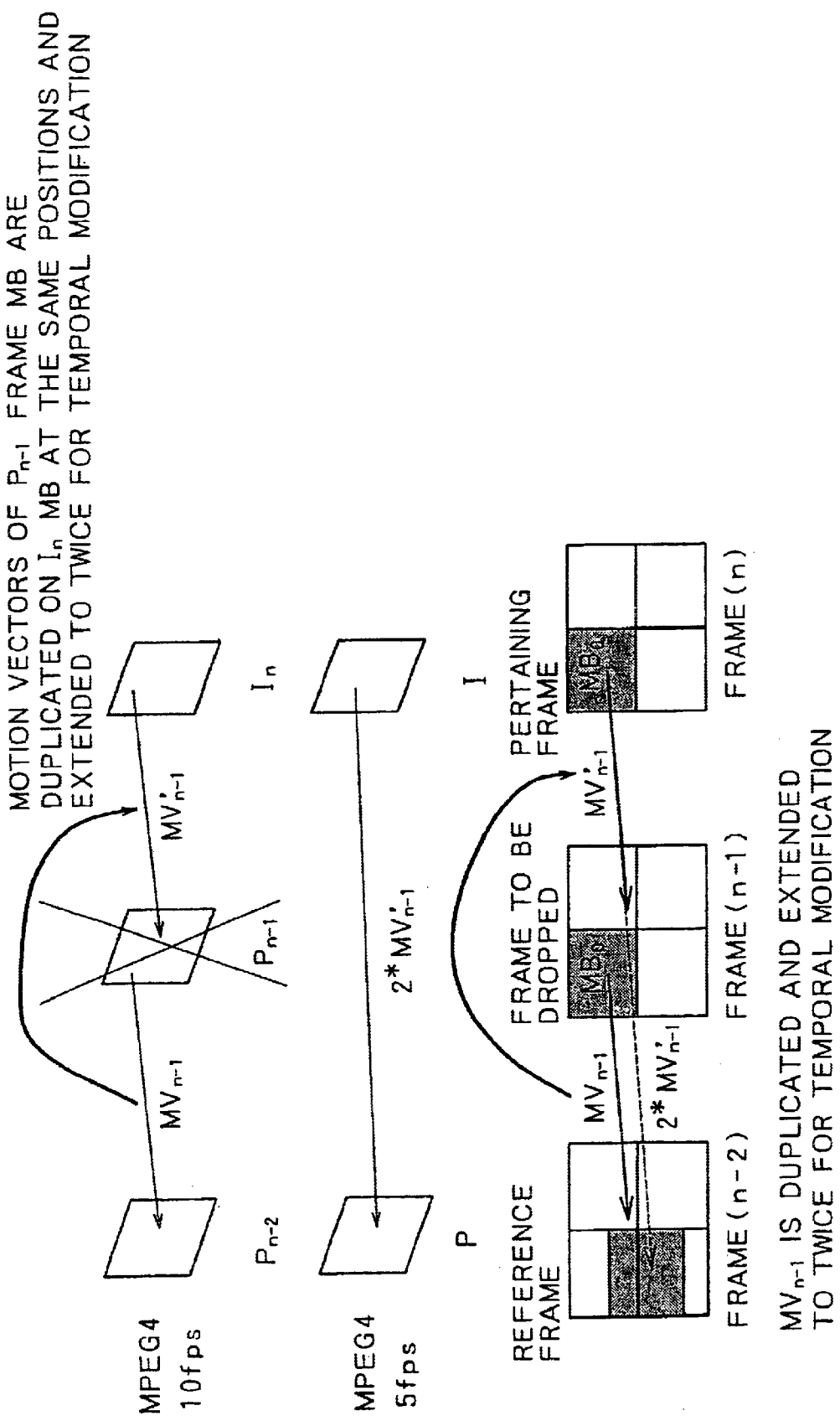
FIG. 35 is a diagrammatic view illustrating a method of converting a VOP converted from an intra-frame into a P-VOP to which a motion vector conversion method of the present invention is applied.

Referring to FIG. 35, there is illustrated a method of converting a VOP converted from an intra-frame into a P-VOP to which the present invention is applied. Where the pertaining frame is an intra-frame, since it does not have a motion vector, motion compensation prediction cannot be utilized for image coding of the frame, resulting in a reduction in coding efficiency. Therefore, in order to produce a motion vector to be utilized for motion compensation prediction, motion vectors of a P frame immediately preceding the intra-frame to be dropped are stored into a buffer, and scaling for spatial and temporal modification described above is performed to duplicate the motion vectors on macro blocks at the same positions of the pertaining frame. Then, since the immediately preceding P frame is dropped, the time interval to a reference frame becomes doubled. Therefore, the copied motion vectors are extended to twice in the temporal direction to perform modification so that another P frame immediately preceding the P frame to be dropped is referred to.

Figure 1:
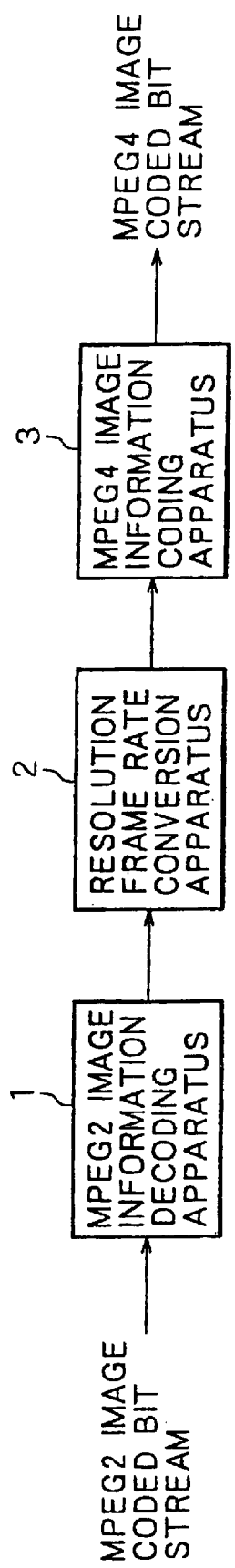
FIG. 1 is a block diagram showing a related art image information conversion apparatus which converts a bit stream representative of image compression information of MPEG2 into another bit stream representative of image compression information of MPEG4.
Figure 2:
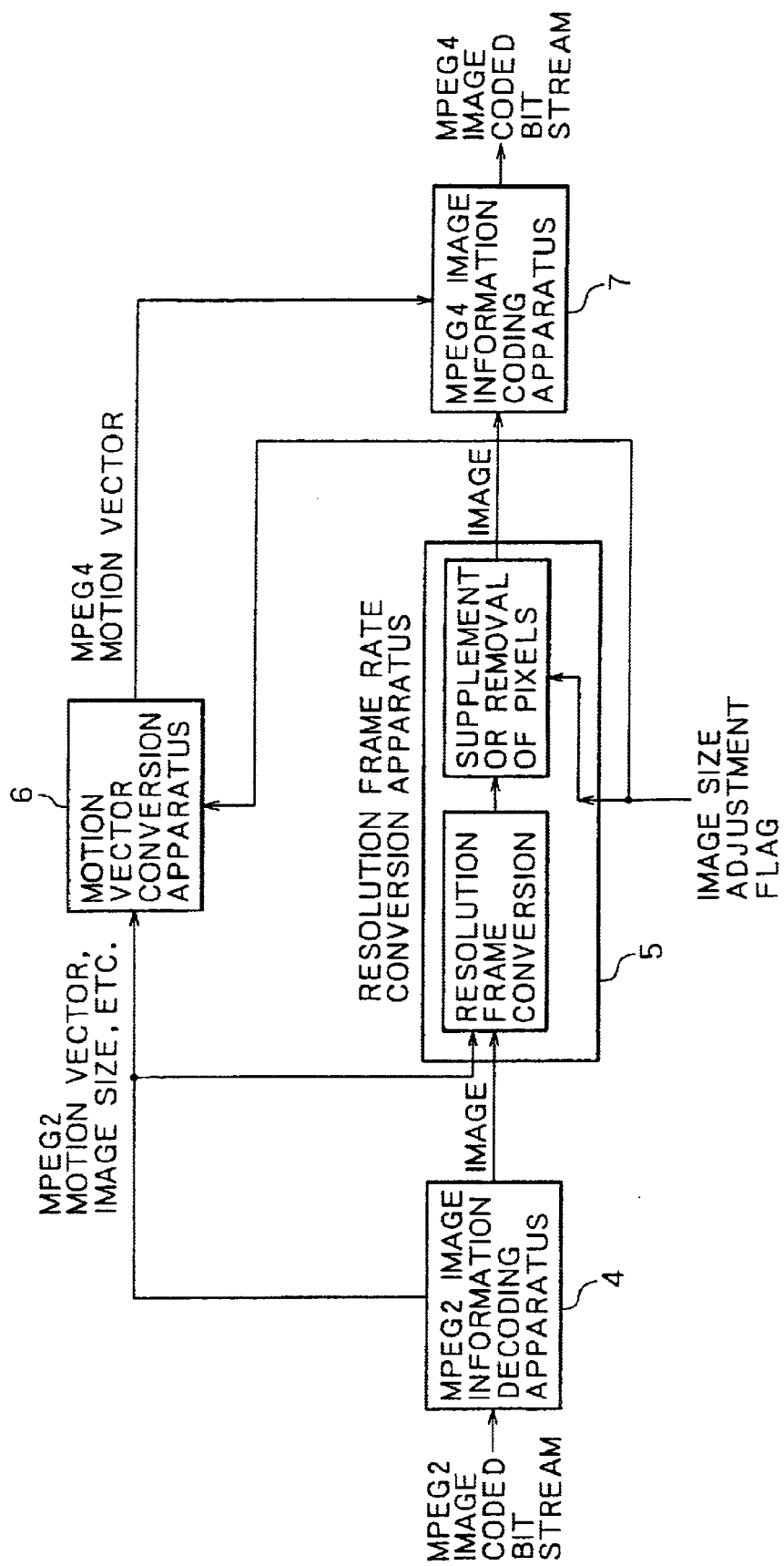
FIG. 2 is a block diagram showing an image information conversion apparatus (related art) proposed by the inventors of the present invention which converts a bit stream representative of image compression information of MPEG2 into another bit stream representative of image compression information of MPEG4.
Figure 3B:
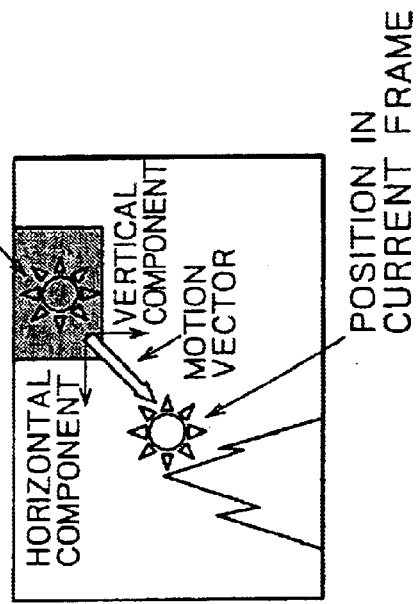
FIGS. 3A and 3B are diagrammatic views illustrating a correlation between a motion vector in a bit stream representative of image compression information of MPEG2 and another motion vector in another bit stream representative of image compression information of MPEG4.
Figure 3A:
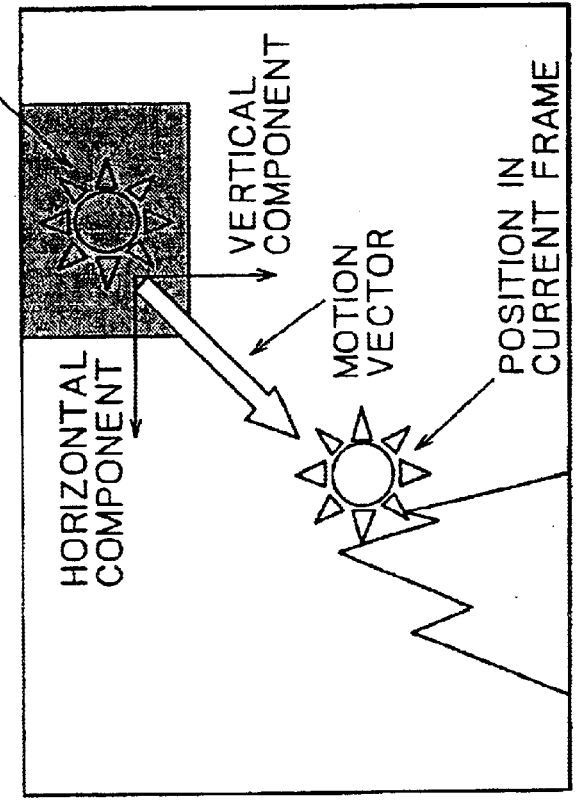
Figure 4:
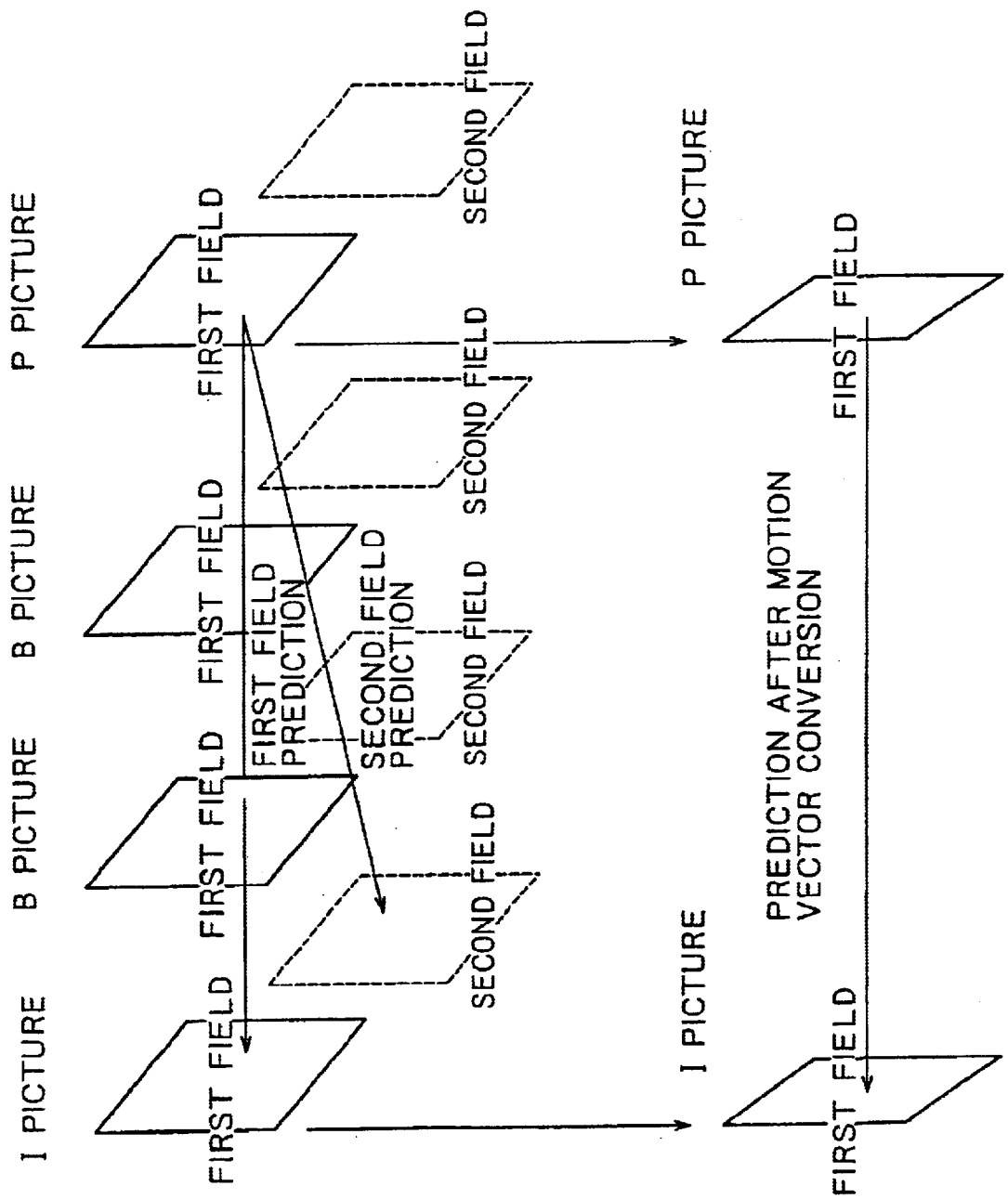
FIG. 4 is a diagrammatic view illustrating a principle of operation of a resolution frame rate conversion apparatus in the image information conversion apparatus of FIG. 2.
Figure 5:
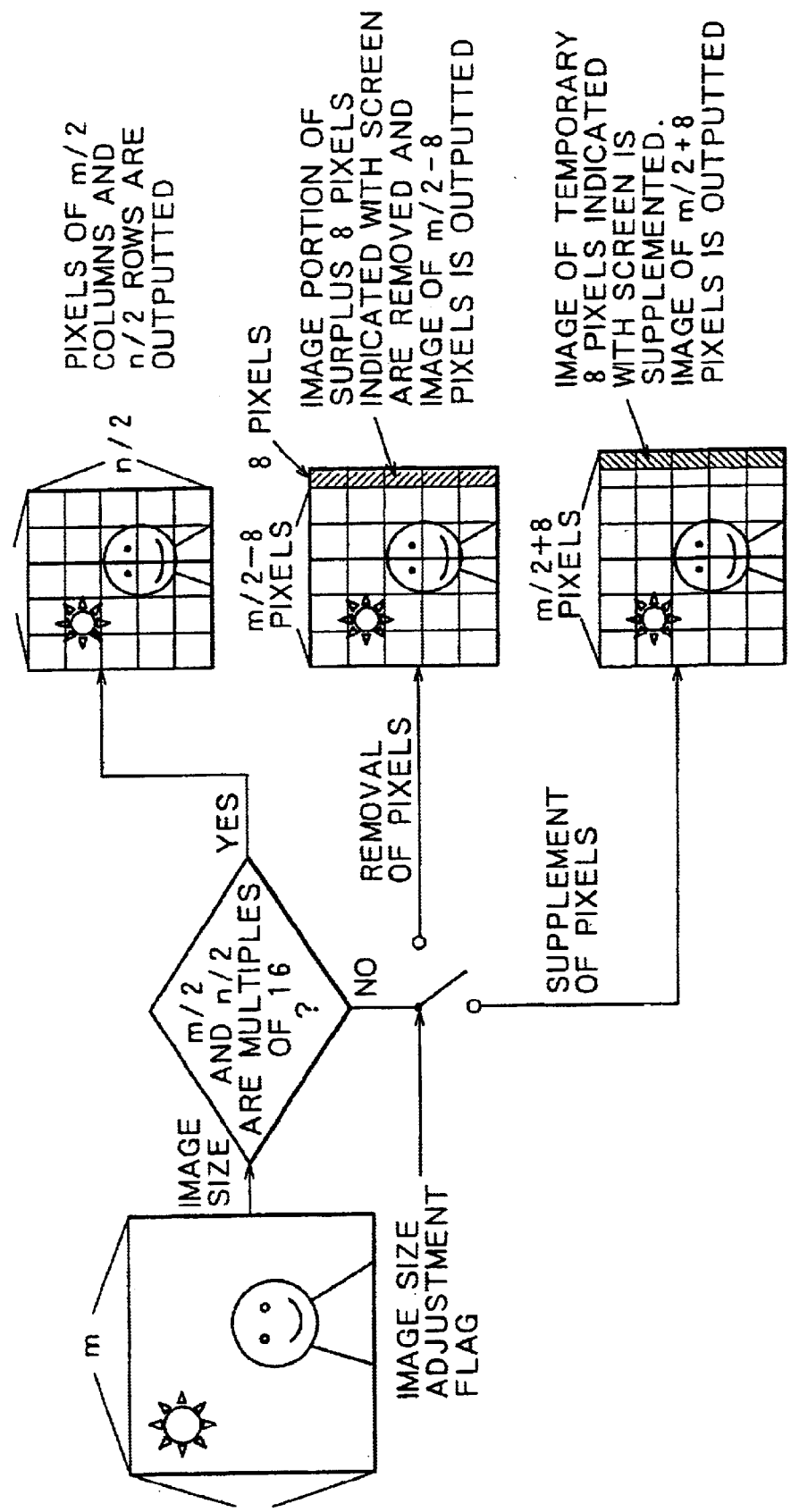
FIG. 5 is a schematic view illustrating a principle of operation of supplementing or removing a pixel of the resolution frame rate conversion apparatus in the image information conversion apparatus of FIG. 2 in accordance with an image frame size adjustment flag.
Figures 6A, 6B:
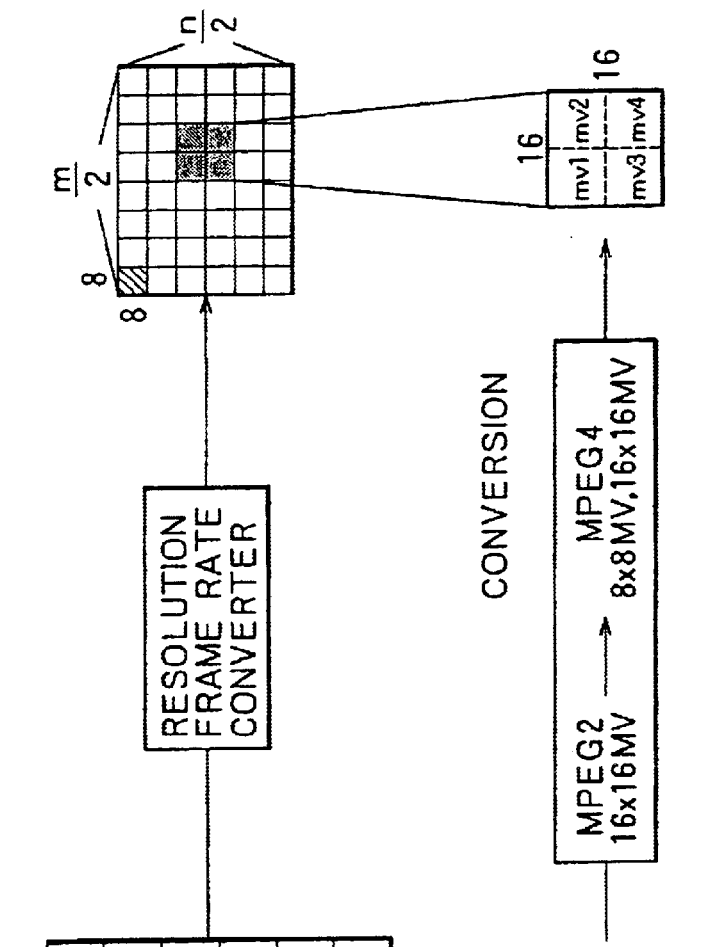
FIGS. 6A and 6B are diagrammatic views illustrating a motion vector conversion method of a motion vector conversion apparatus in the image information conversion apparatus of FIG. 2.
Figure 7:
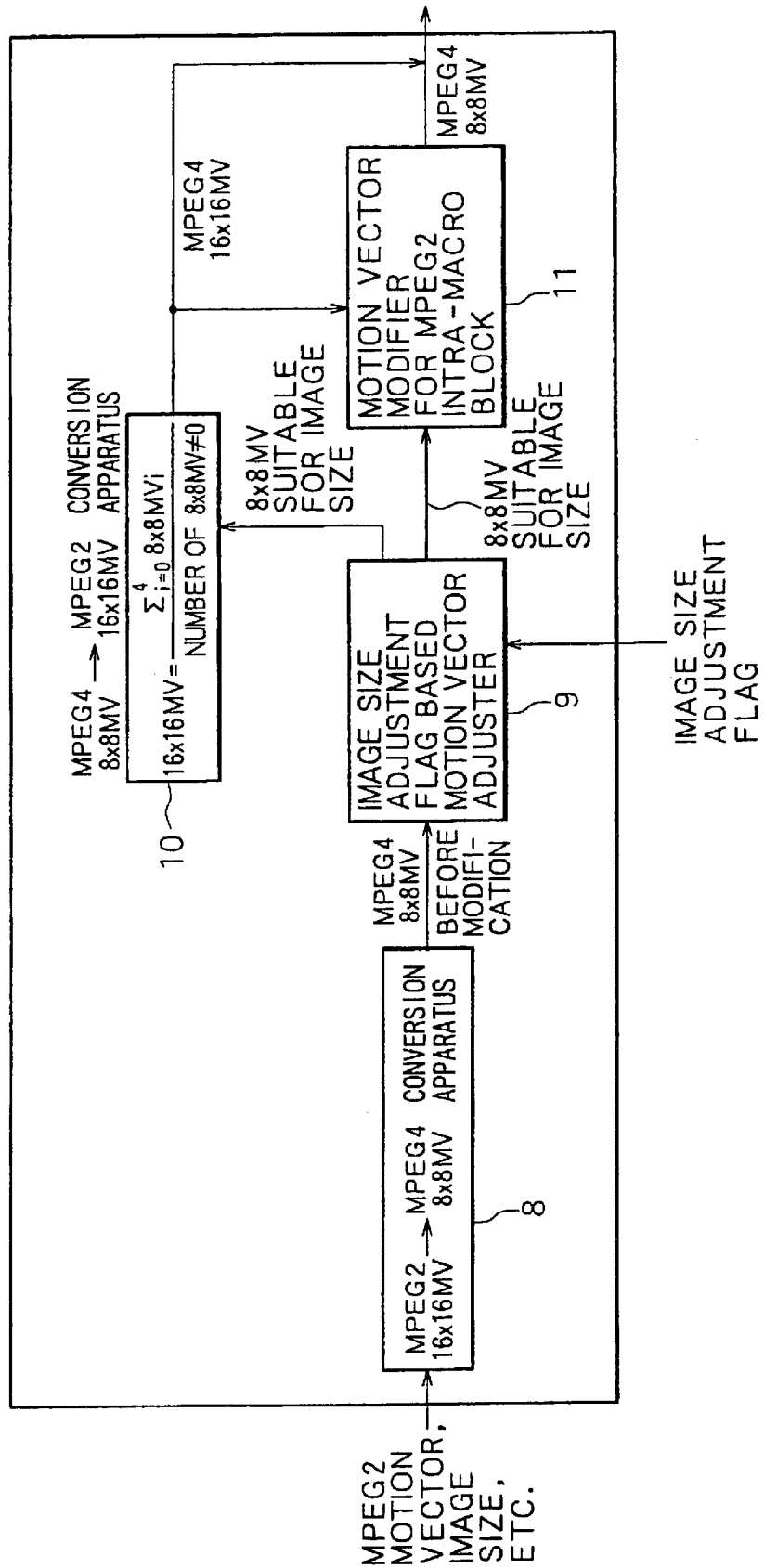
FIG. 7 is a block diagram showing a detailed configuration of the motion vector conversion apparatus in the image information conversion apparatus of FIG. 2.
Figure 8:
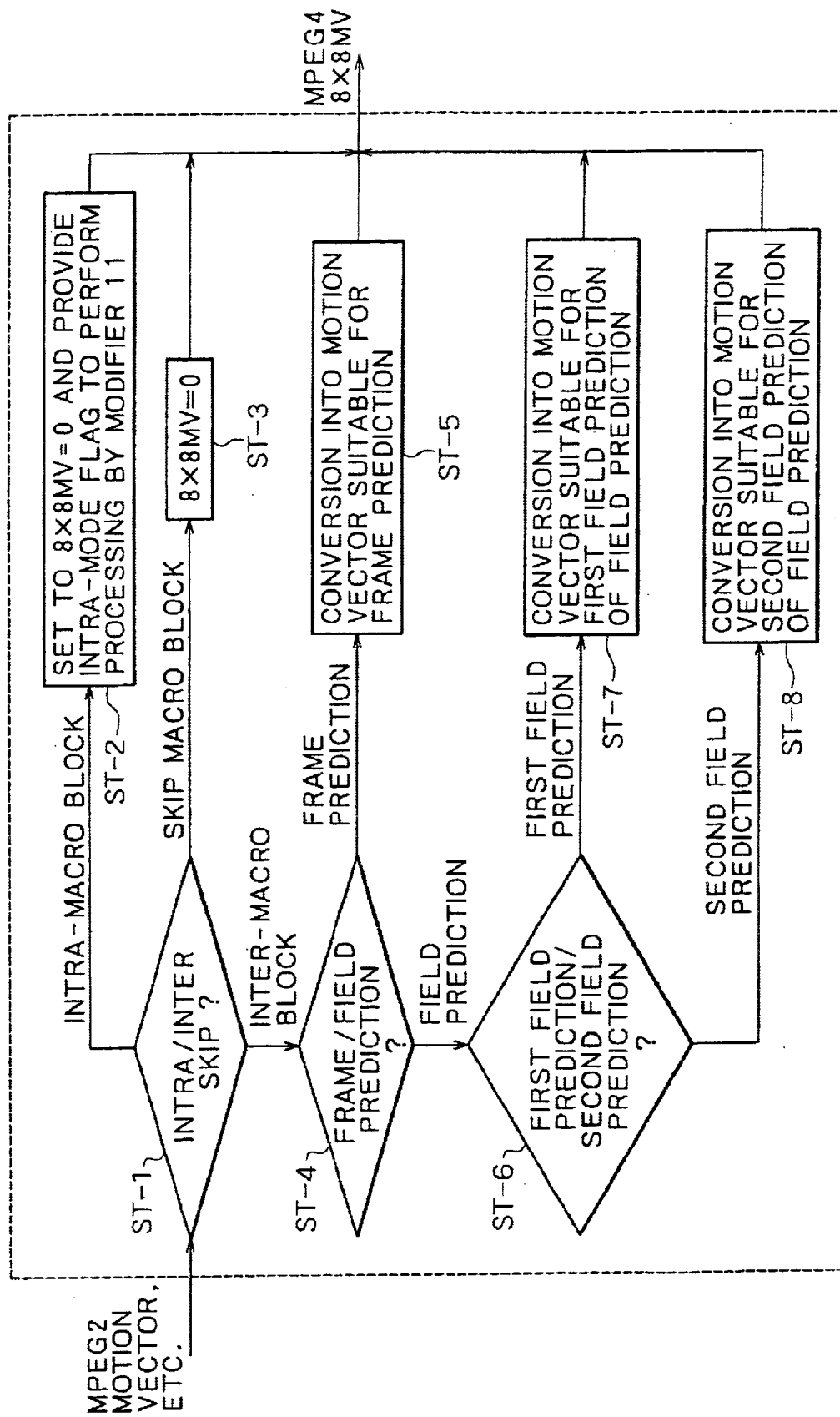
FIG. 8 is a flow chart illustrating a principle of operation of an MPEG2 16×16 motion vector to MPEG4 8×8 motion vector conversion apparatus in the image information conversion apparatus of FIG. 2.
Figure 9B:
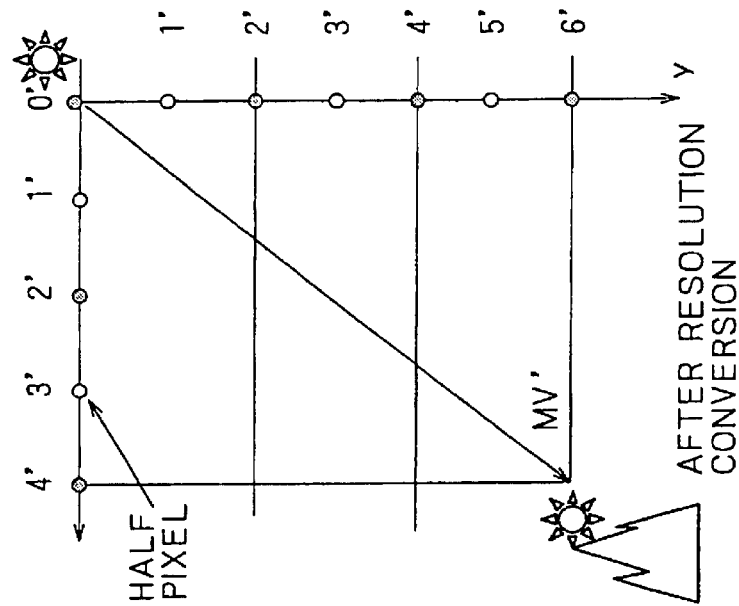
FIGS. 9A and 9B are diagrammatic views illustrating a concept of motion vector conversion of the MPEG2 16×16 motion vector to MPEG4 8×8 motion vector conversion apparatus in the motion vector conversion apparatus of FIG. 7 wherein a frame structure and frame prediction are used.
Figure 9A:
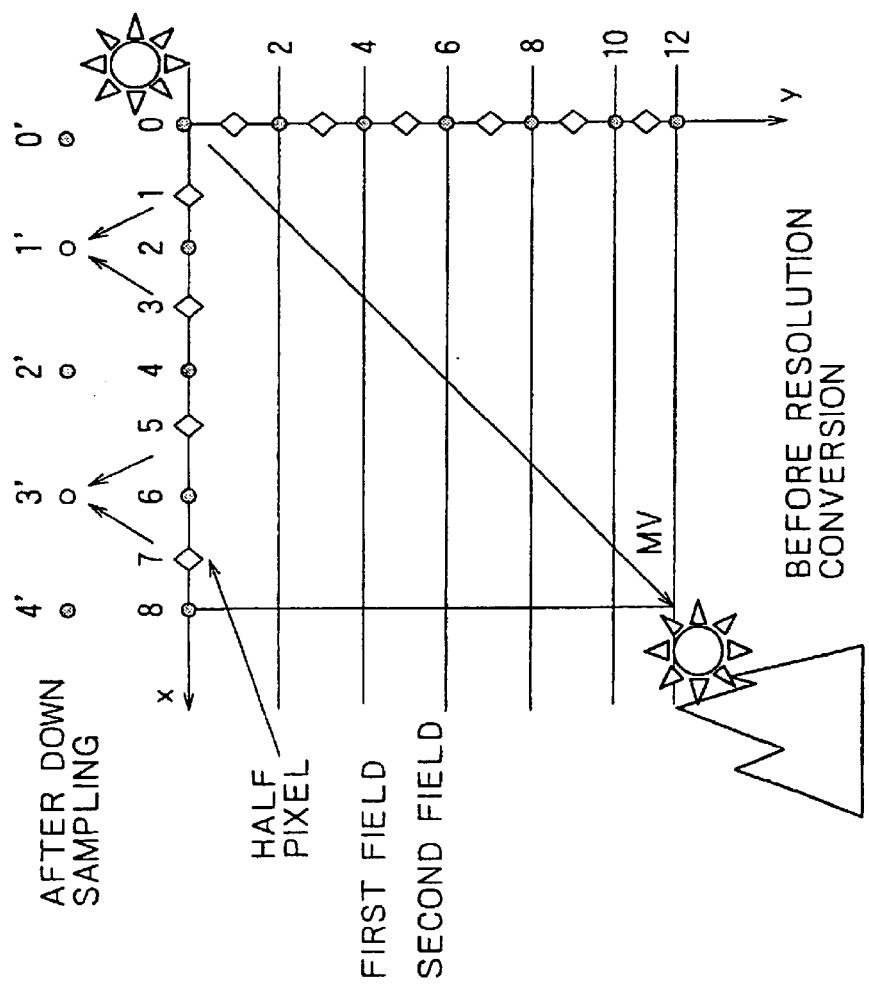
Figure 13:
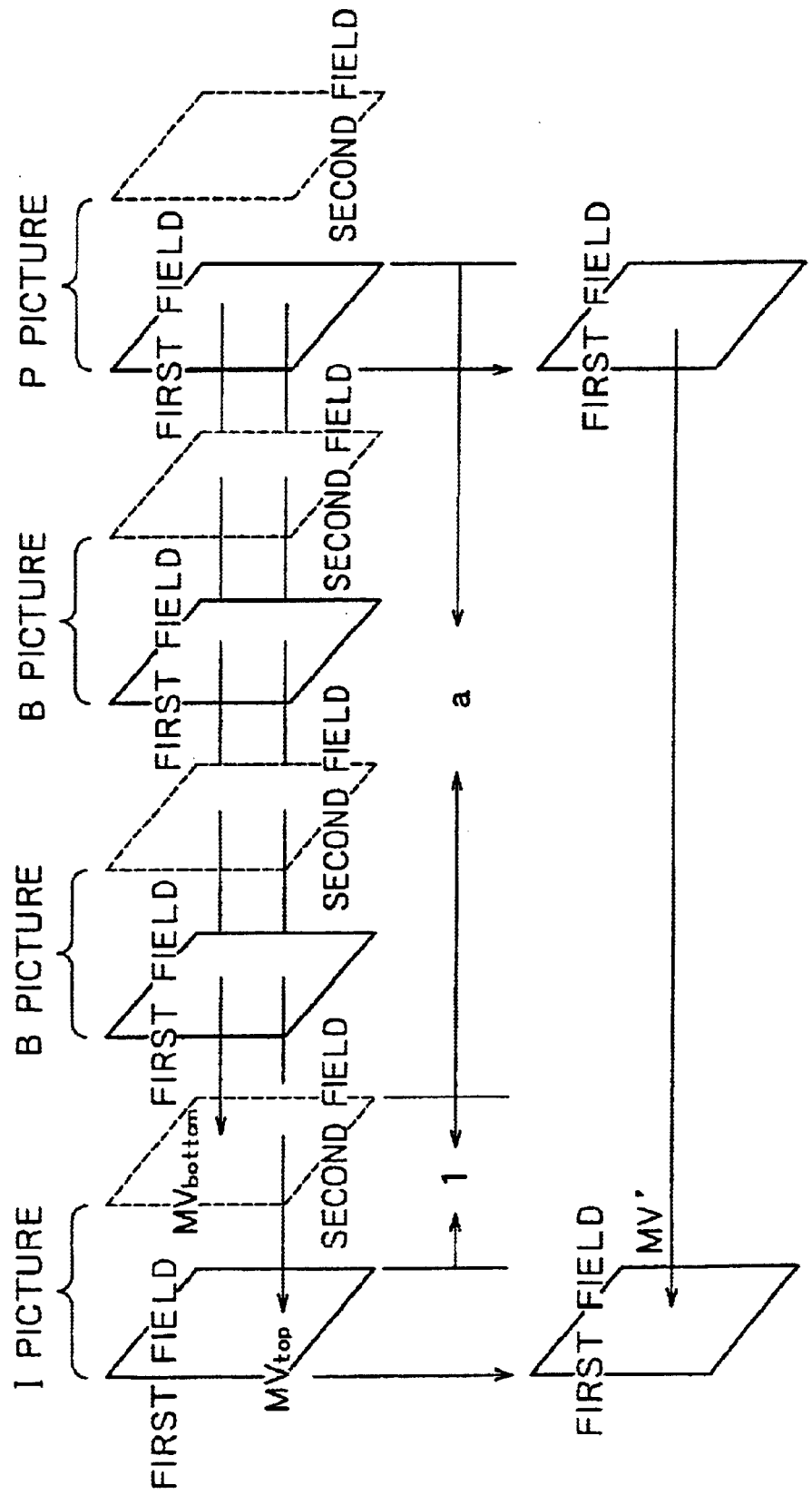
FIG. 13 is a diagrammatic view illustrating motion vect or conversion wherein the image illustrated in FIG. 9 has a frame structure and second field prediction is used.
Figure 14:
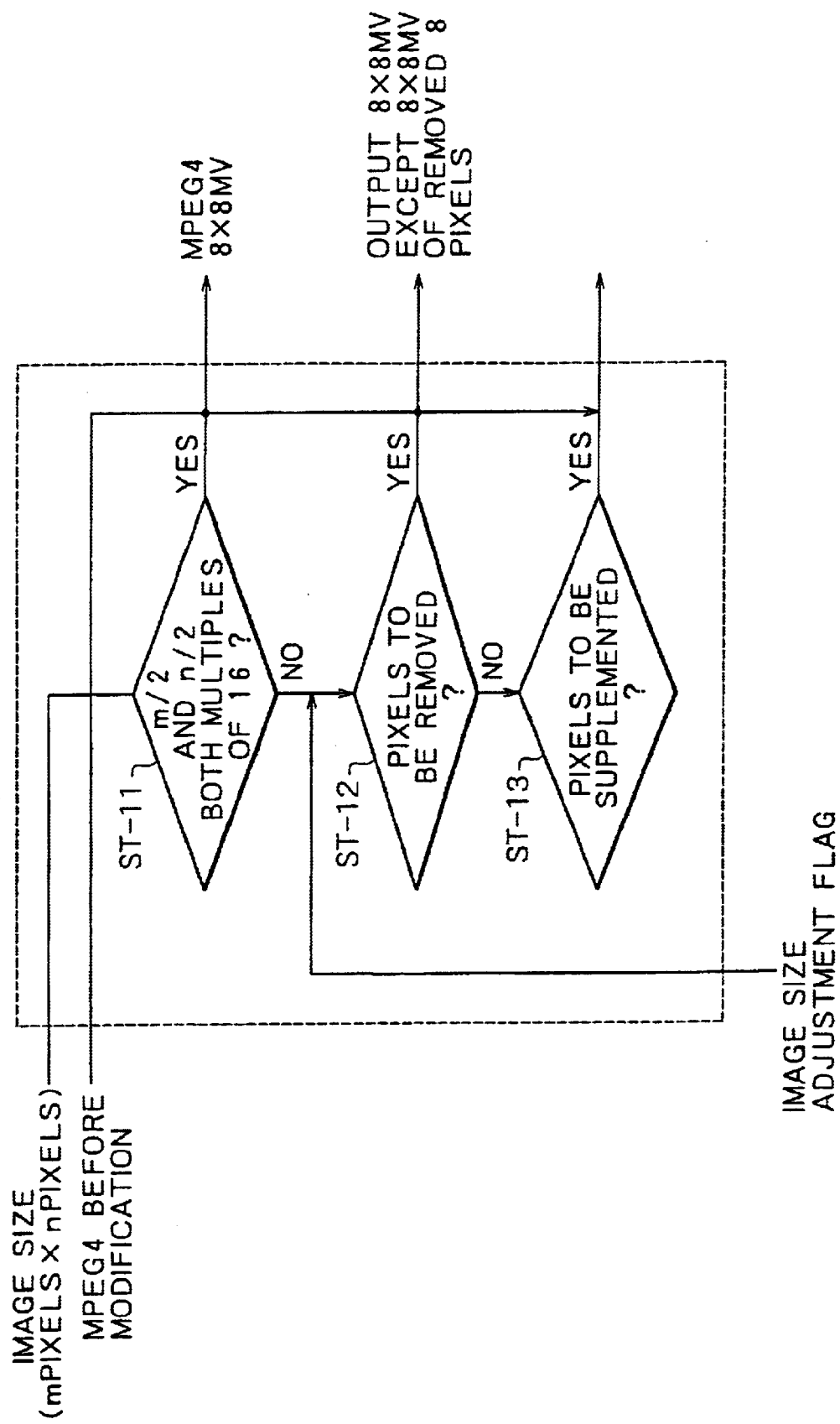
FIG. 14 is a flow chart illustrating operation of a motion vector modifier which operates with an image size adjustment flag in the motion vector conversion apparatus of FIG. 7.
Figure 15:
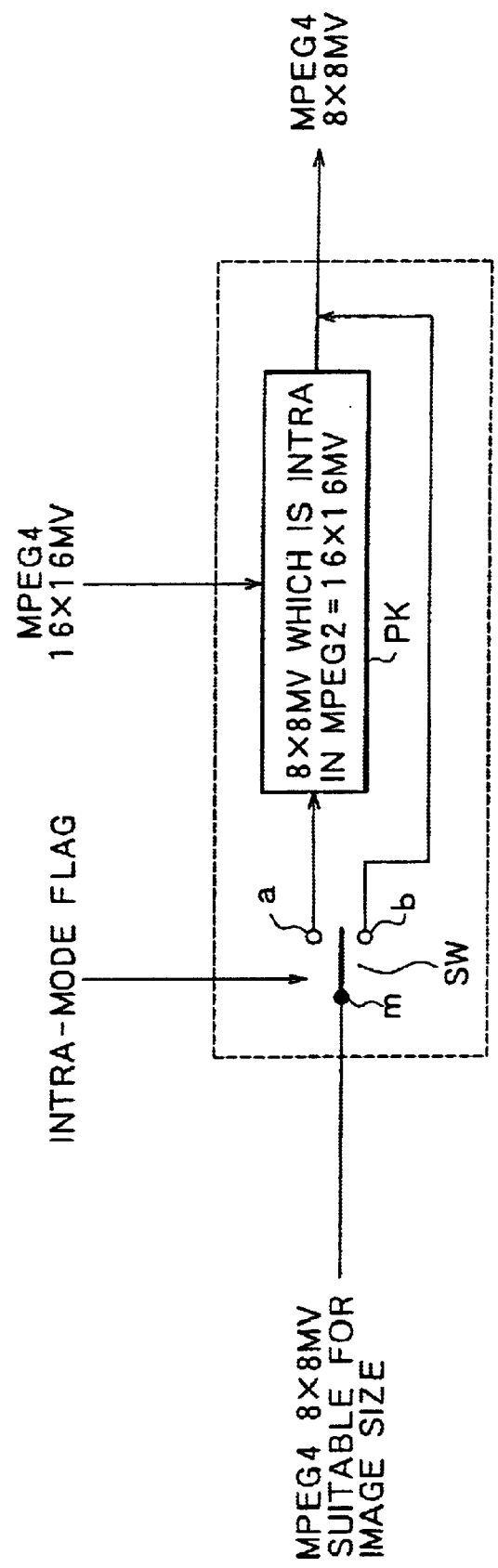
FIG. 15 is a block diagram illustrating a principle of operation of the motion vector mo difier shown in FIG. 7 which performs motion vector modification for an intra-macro block of MPEG2.
Figure 16:
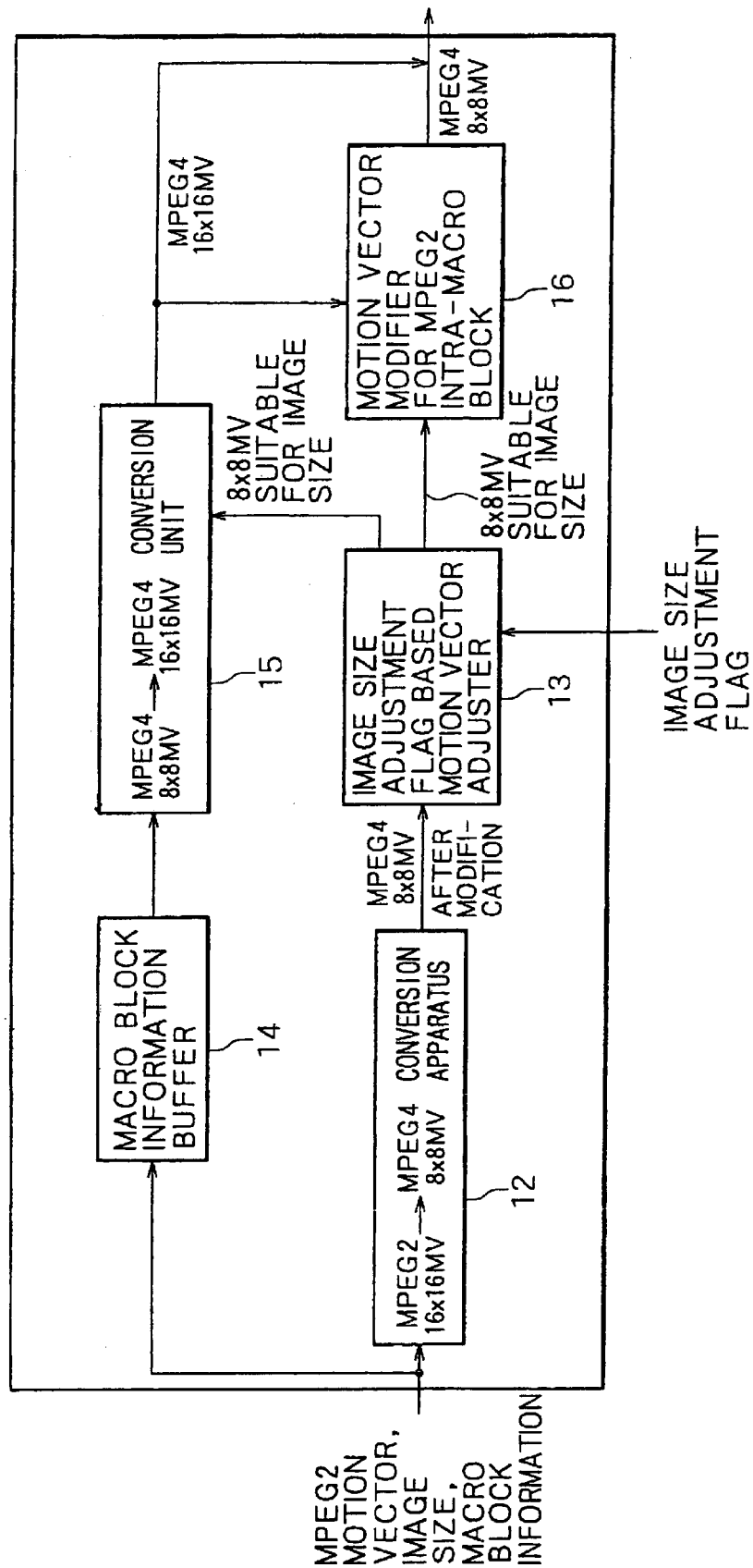
FIG. 16 is a block diagram show ing a de tailed configuration of the motion vector conversion apparatus in the image information conversion apparatus of FIG. 2.
Figure 17B:
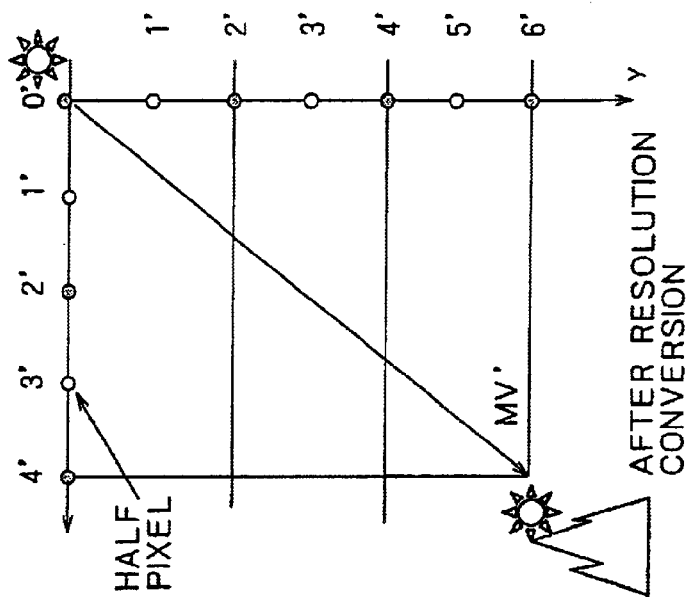
FIGS. 17A and 17B are diagrammatic views illustrating a concept of motion vector conversion by the MPEG2 16×16 motion vector to MPEG4 8×8 motion vector conversion apparatus, which performs a motion vector research, in the motion vector conversion apparatus of FIG. 7 wherein a frame structure and frame prediction are used.
Figure 17A:
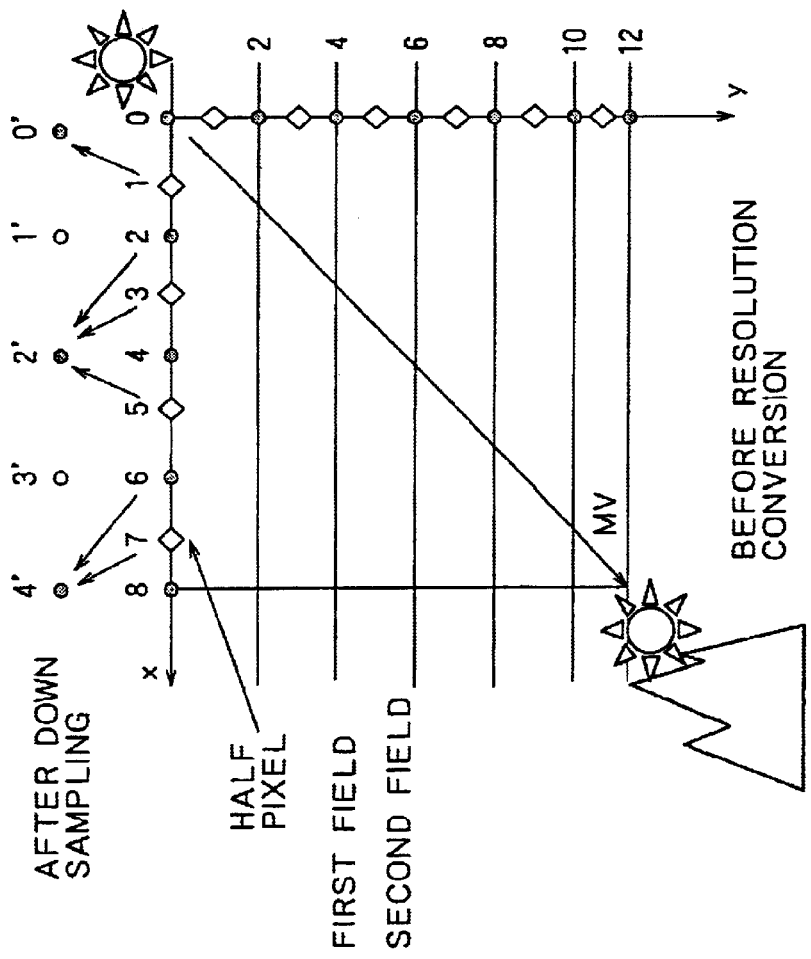
Figure 19B:
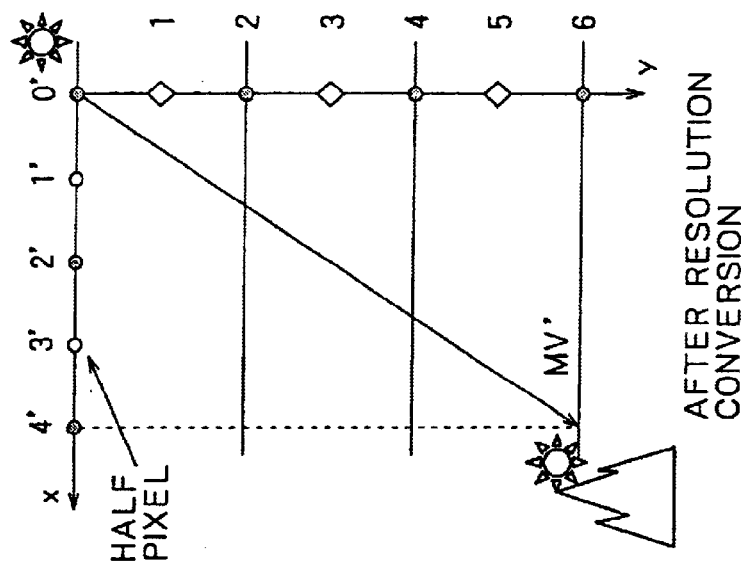
FIGS. 19A and 19B are diagrammatic views illustrating a concept of motion vector conversion wherein the image when a motion-vector re-search is performed by the motion vector conversion apparatus of FIG. 7 has a frame structure and first field prediction is used.
Figure 19A:
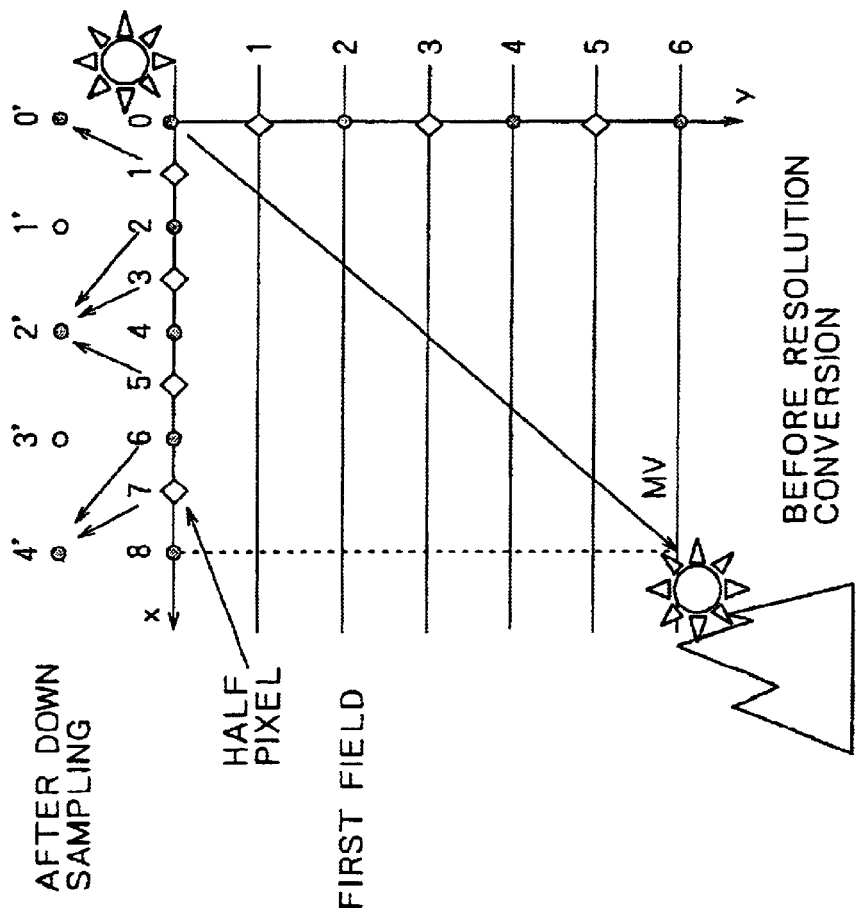
Figure 21:
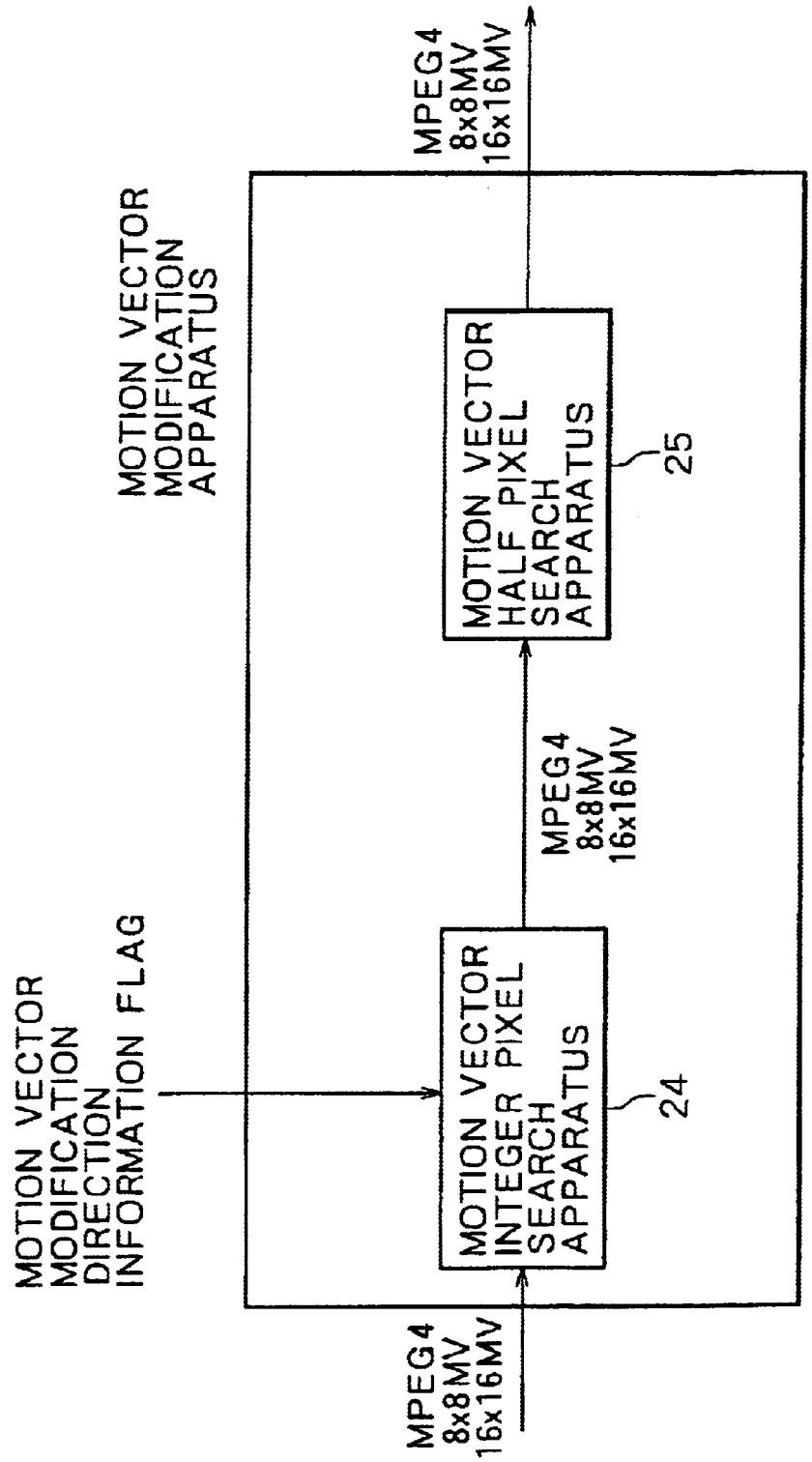
FIG. 21 is a block diagram showing a motion vector modification apparatus.
Figure 22:
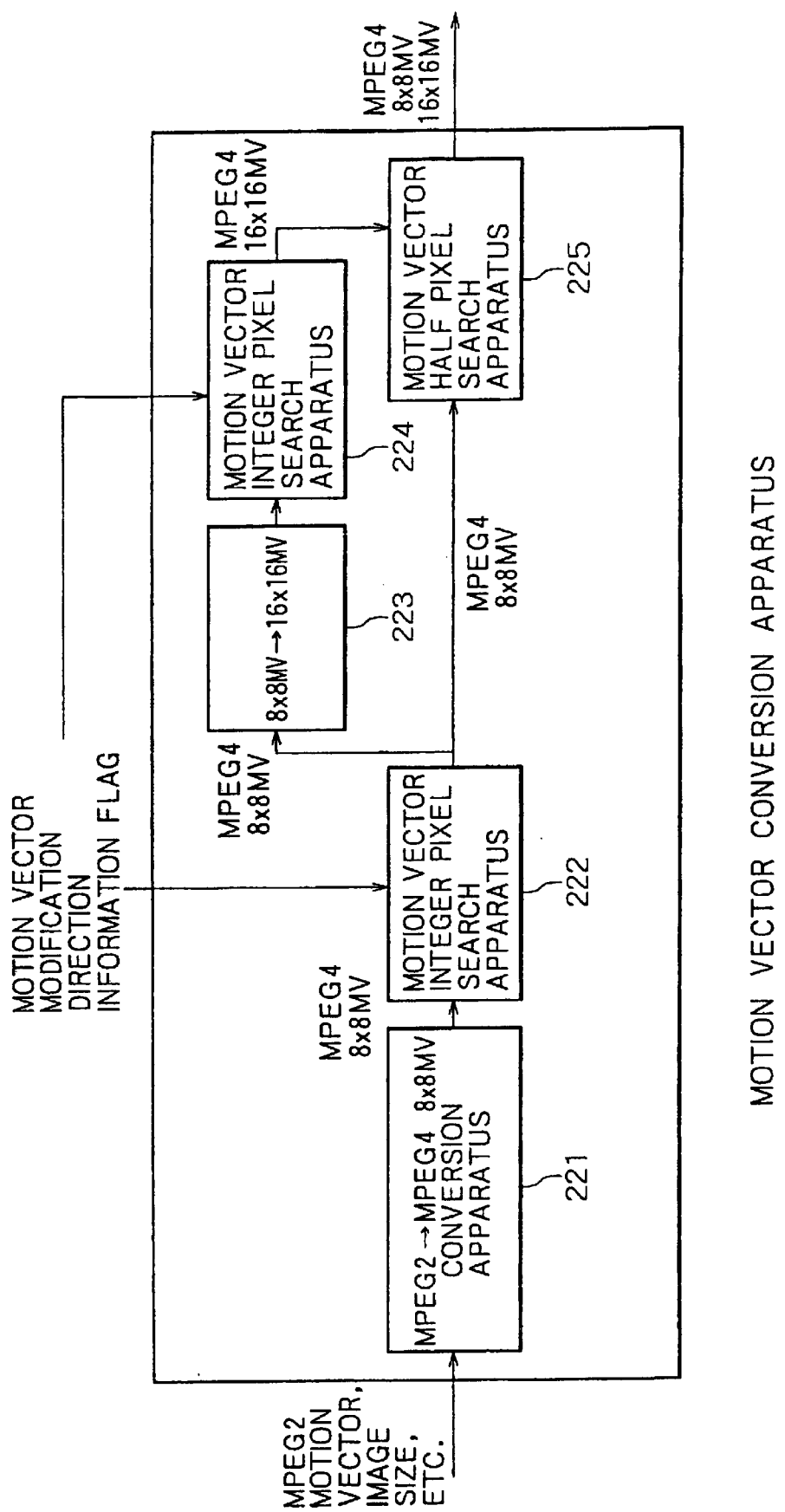
FIG. 22 is a block diagram showing a motion vector re-search apparatus which performs a re-search process for an 8×8 motion vector and produces a 16×16 motion vector based on a predictive residual.
Figure 23A:
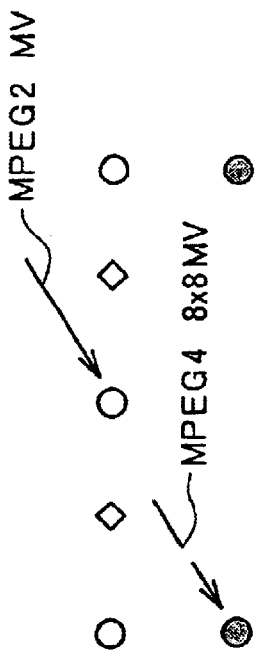
FIGS. 23A and 23B are diagrammatic views illustrating a distortion of a motion vector by spatial modification.
Figure 23B:
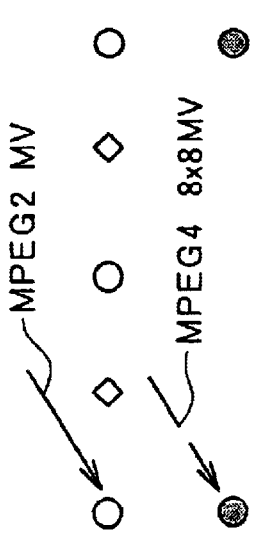
Figure 24A:
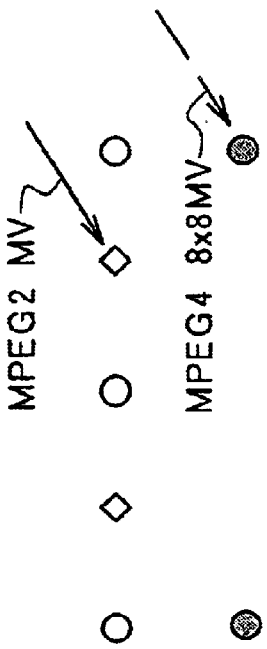
FIGS. 24A and 24B are diagrammatic views illustrating a distortion of a motion vector by spatial modification.
Figure 24B:
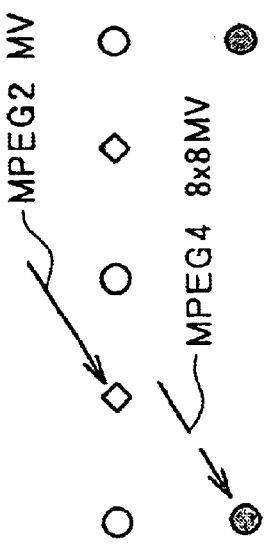
Figure 26:
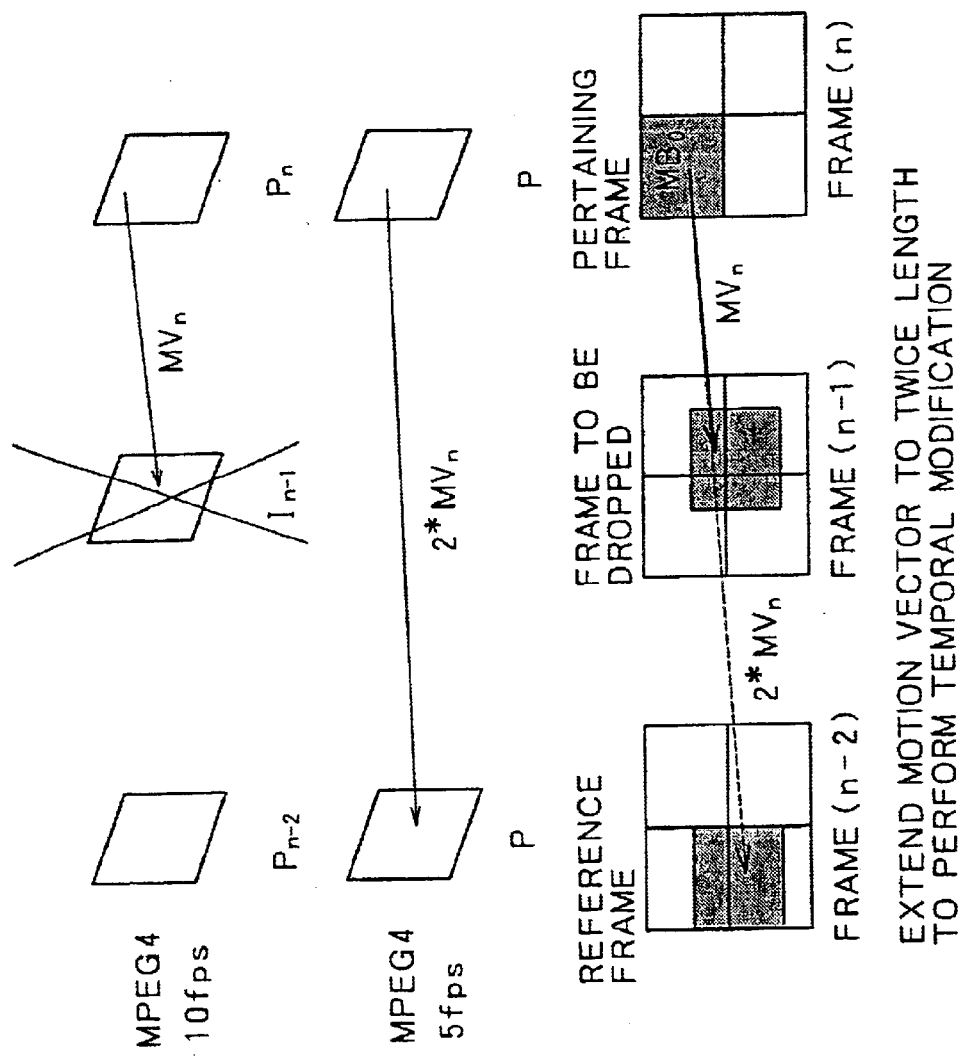
FIG. 26 is a diagrammatic view illustrating dropping of an I frame.
Figure 27:
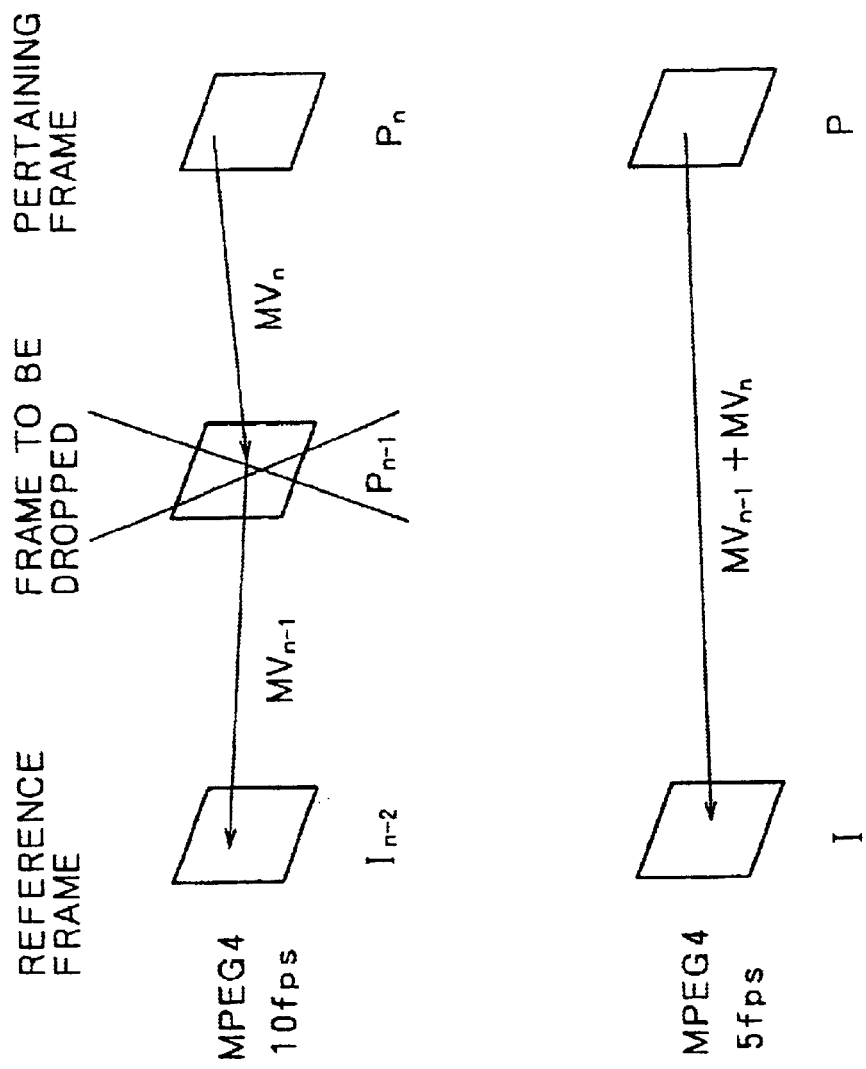
FIGS. 27 and 28 are diagrammatic views illustrating dropping of a P frame.
Figure 28:
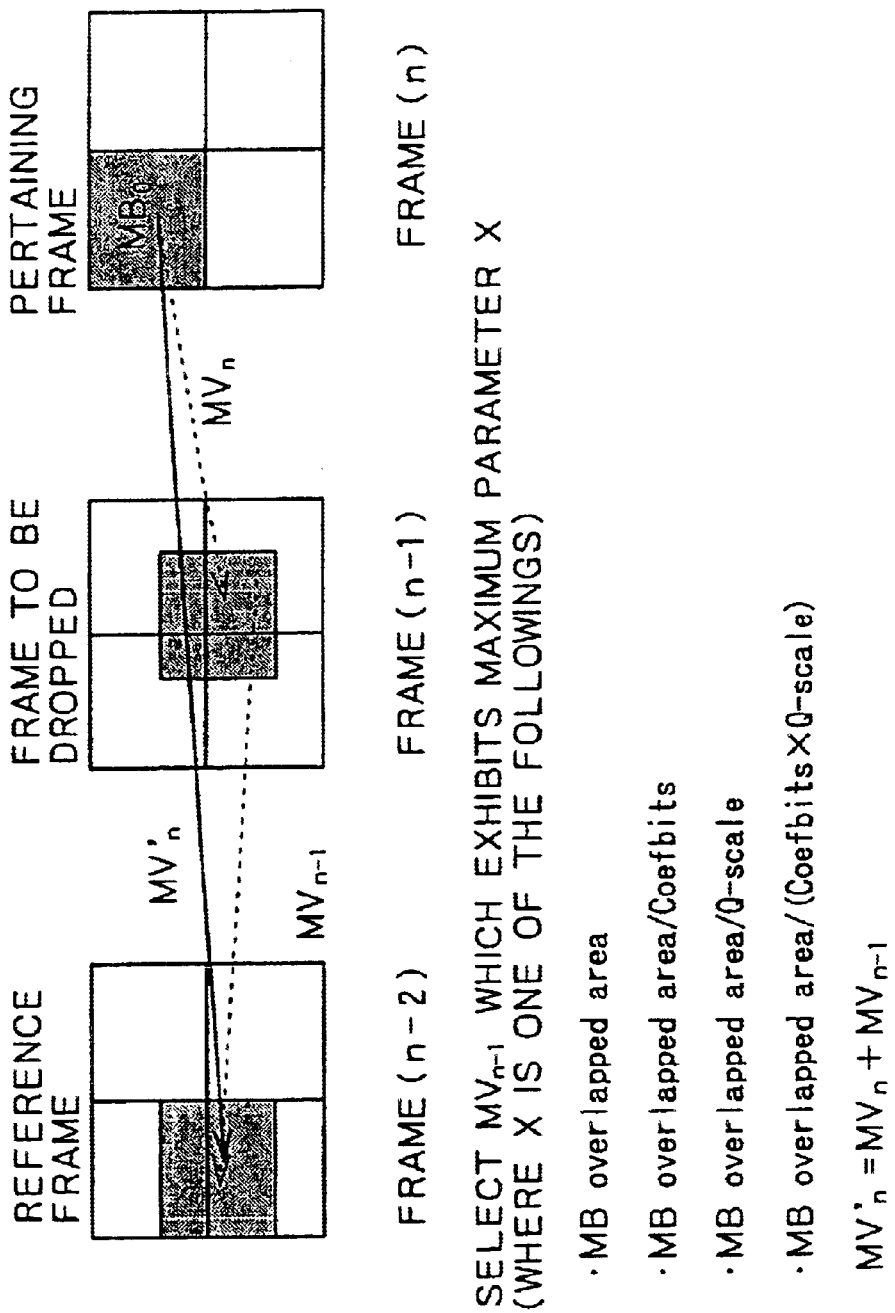
Figure 29:
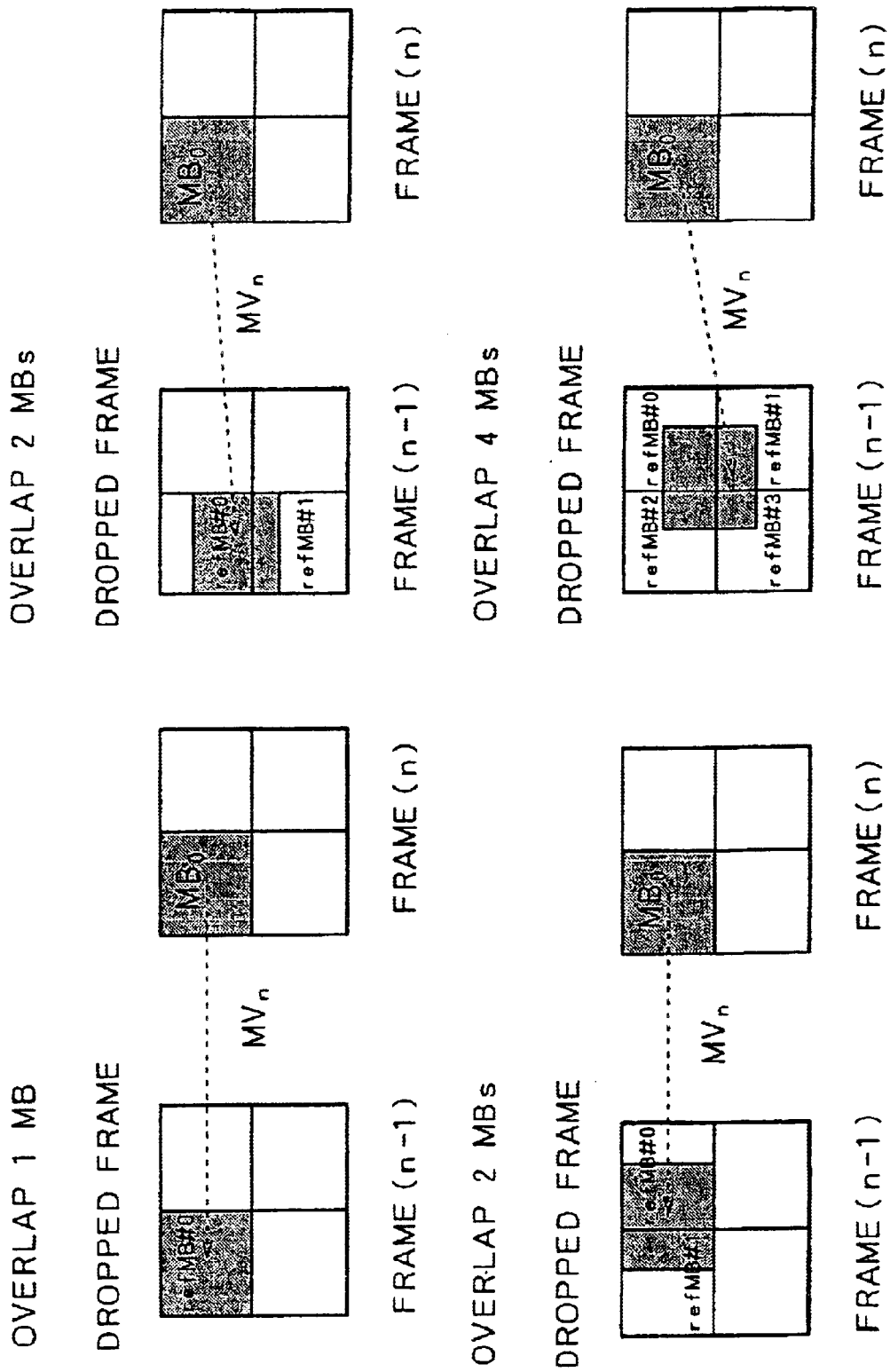
FIG. 29 is a diagrammatic view illustrating in what manner a reference pixel overlaps with a plurality of macro blocks.
Figure 30:
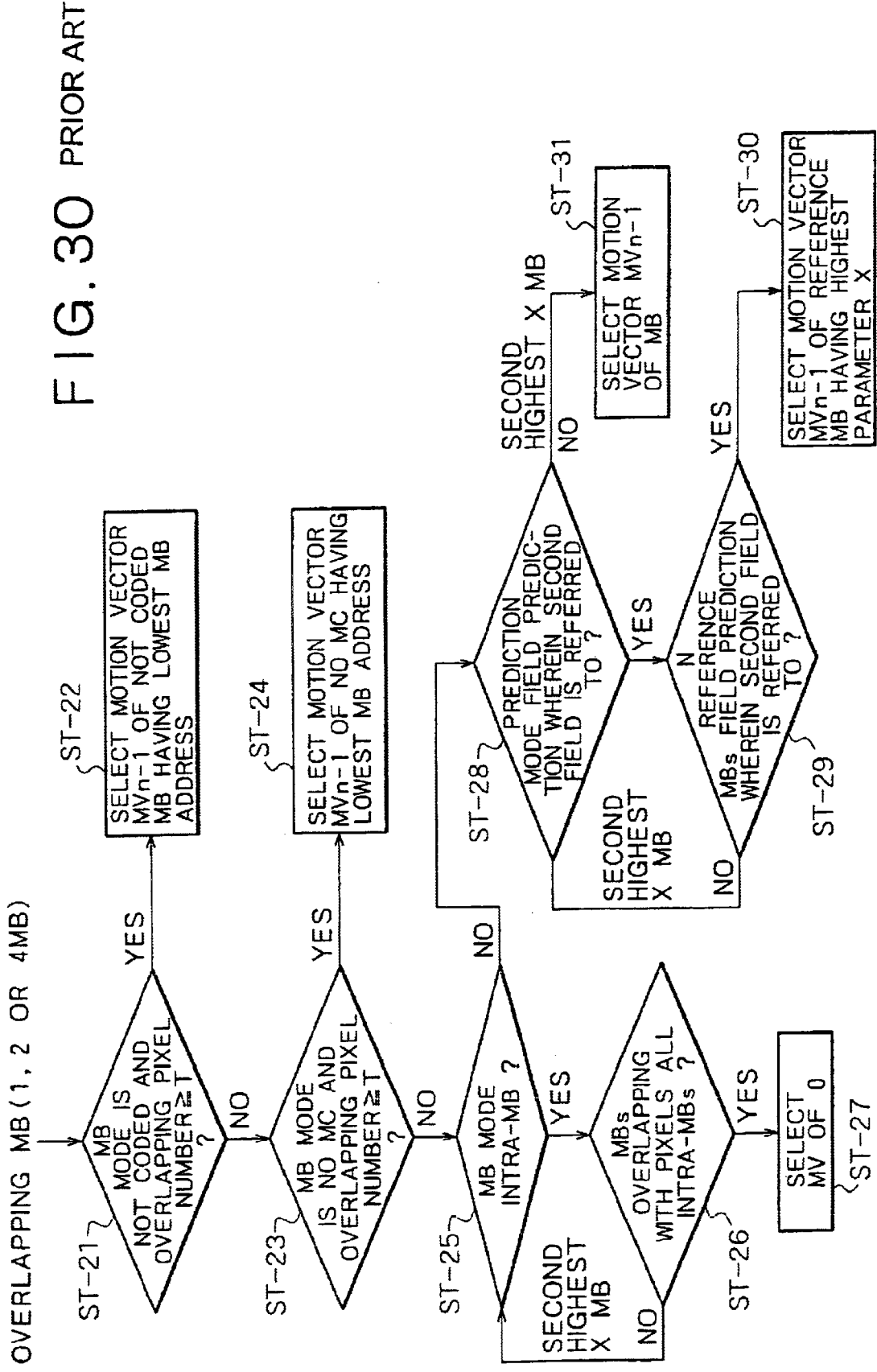
FIG. 30 is a flow chart illustrating a motion vector synthesis algorithm where a P frame is dropped.
Figure 31:
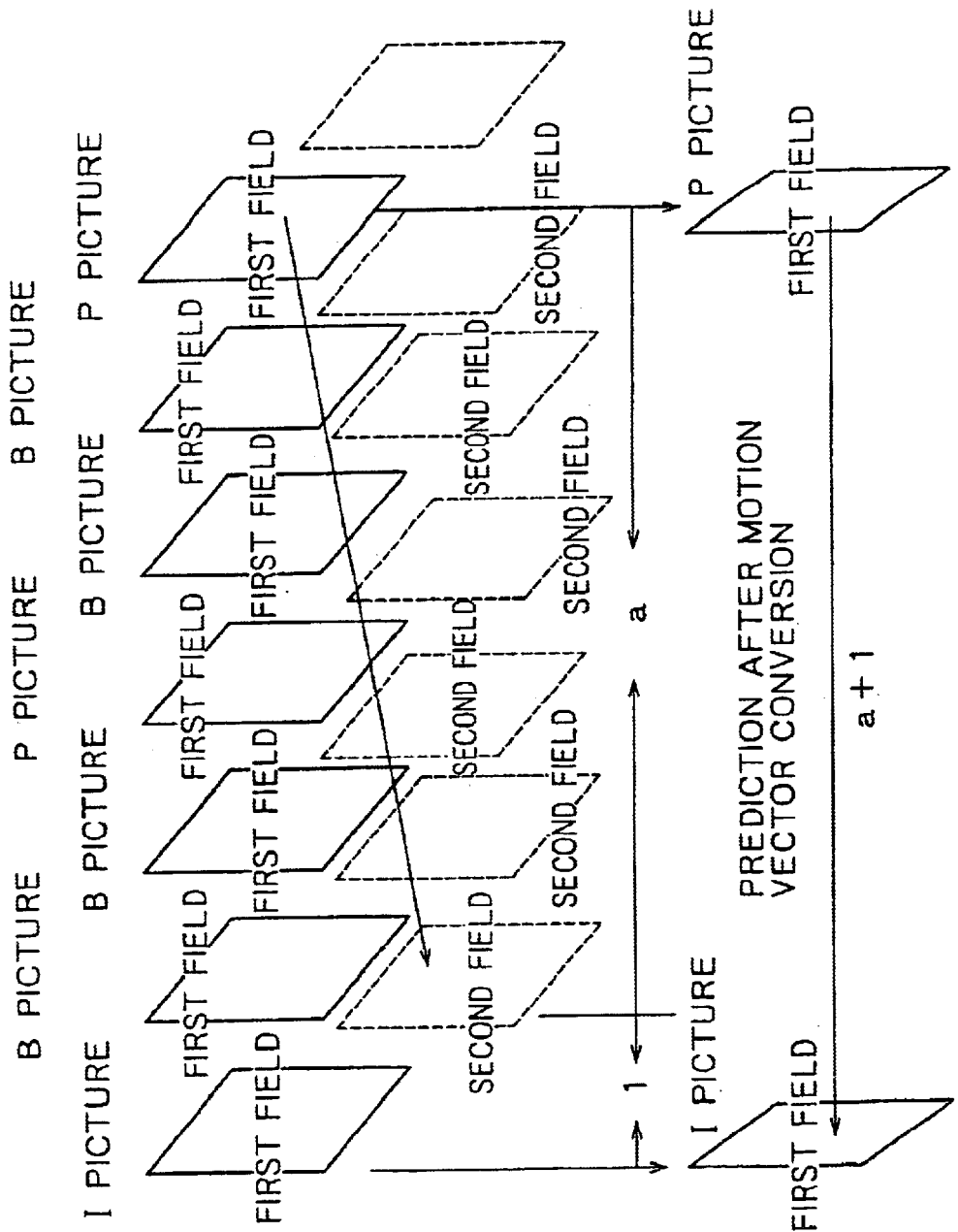
Figure 32:
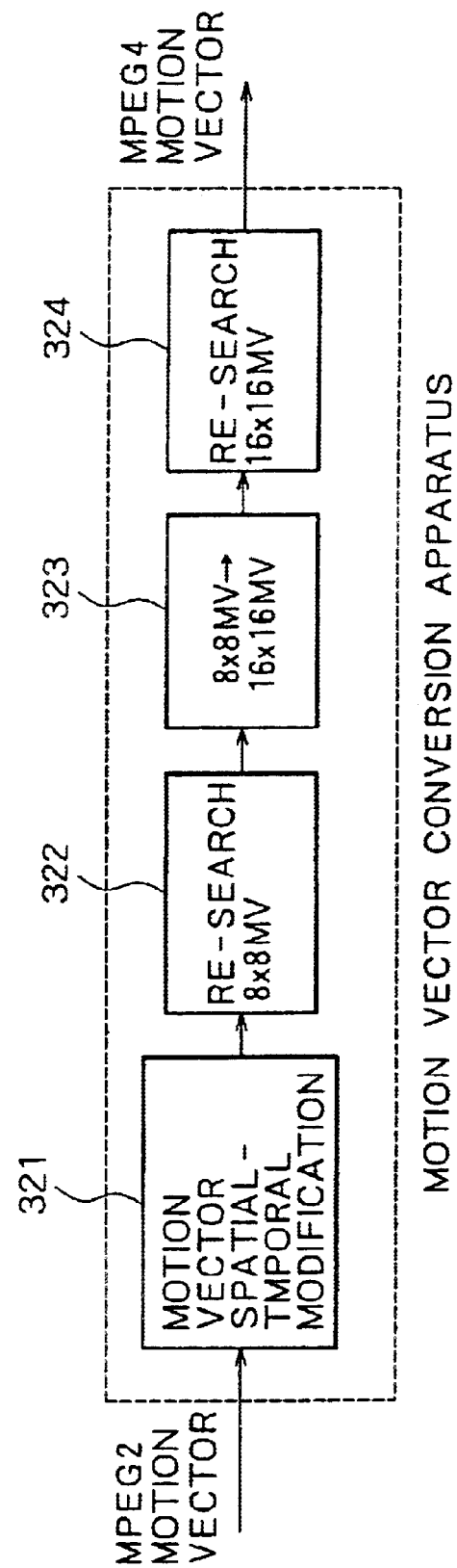
FIG. 32 is a block diagram showing another configuration of the motion vector conversion apparatus.
Figure 33:
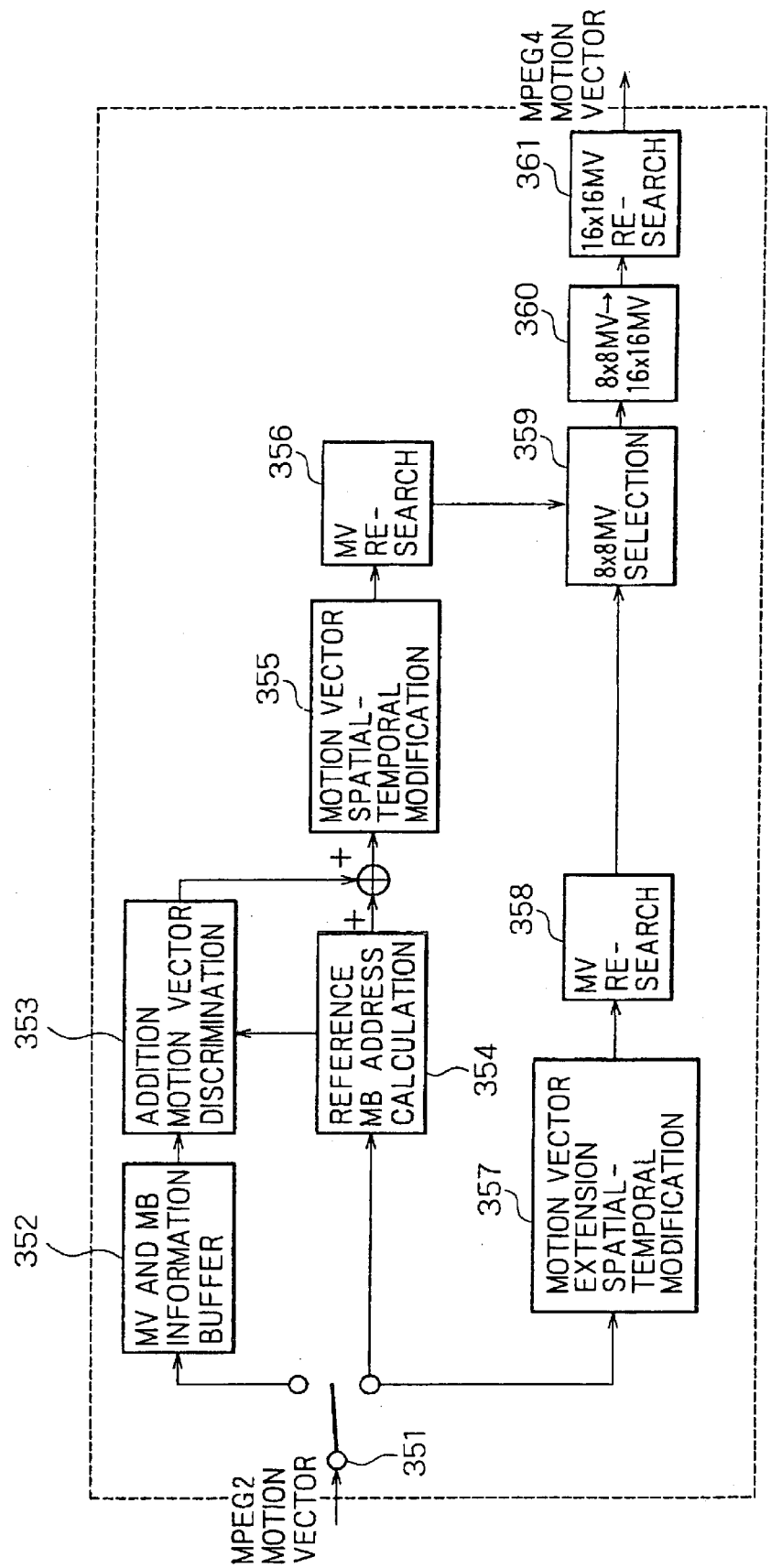
FIG. 33 is a block diagram showing a further configuration of the motion vector conversion apparatus.
Figure 34:
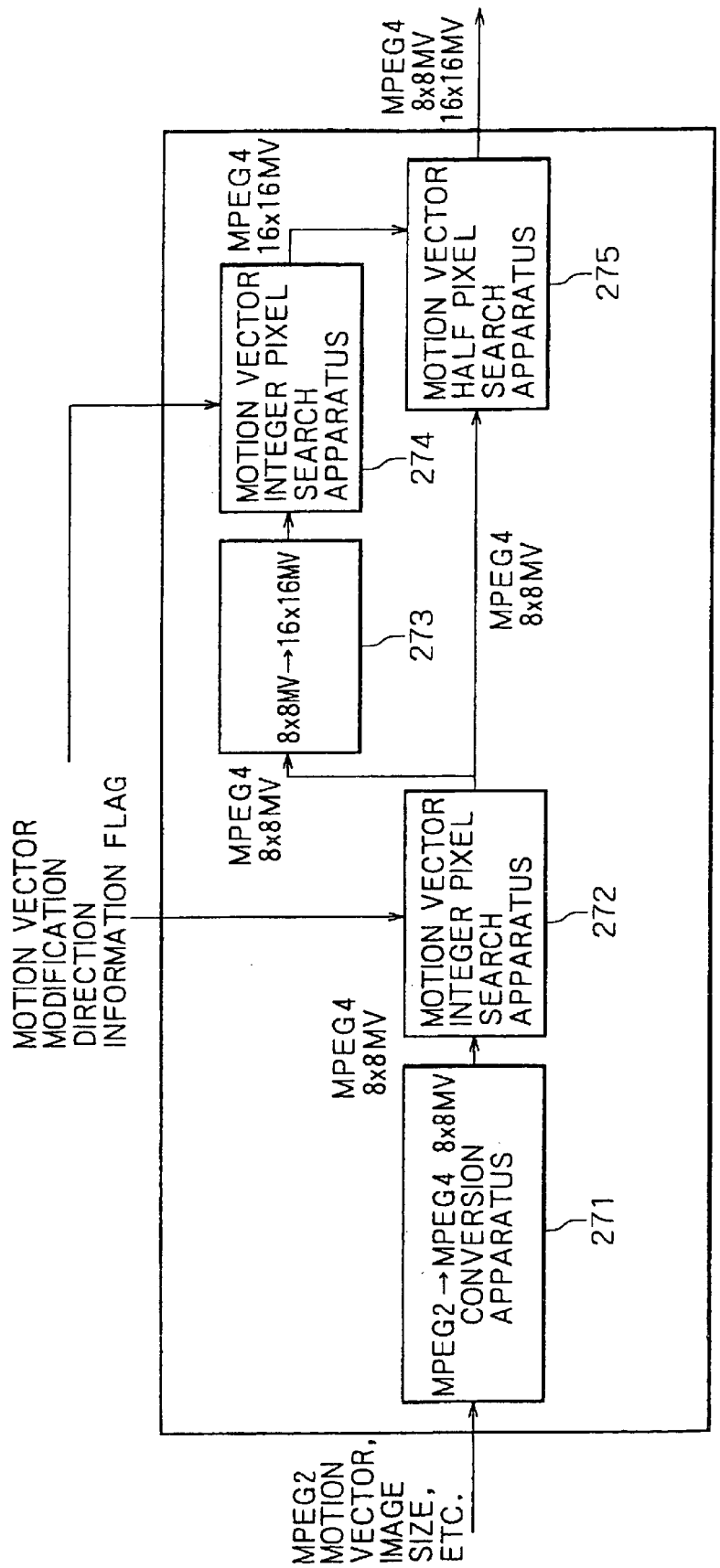
FIG. 34 is a block diagram showing a still further configuration of the motion vector conversion apparatus.
Figure 36:
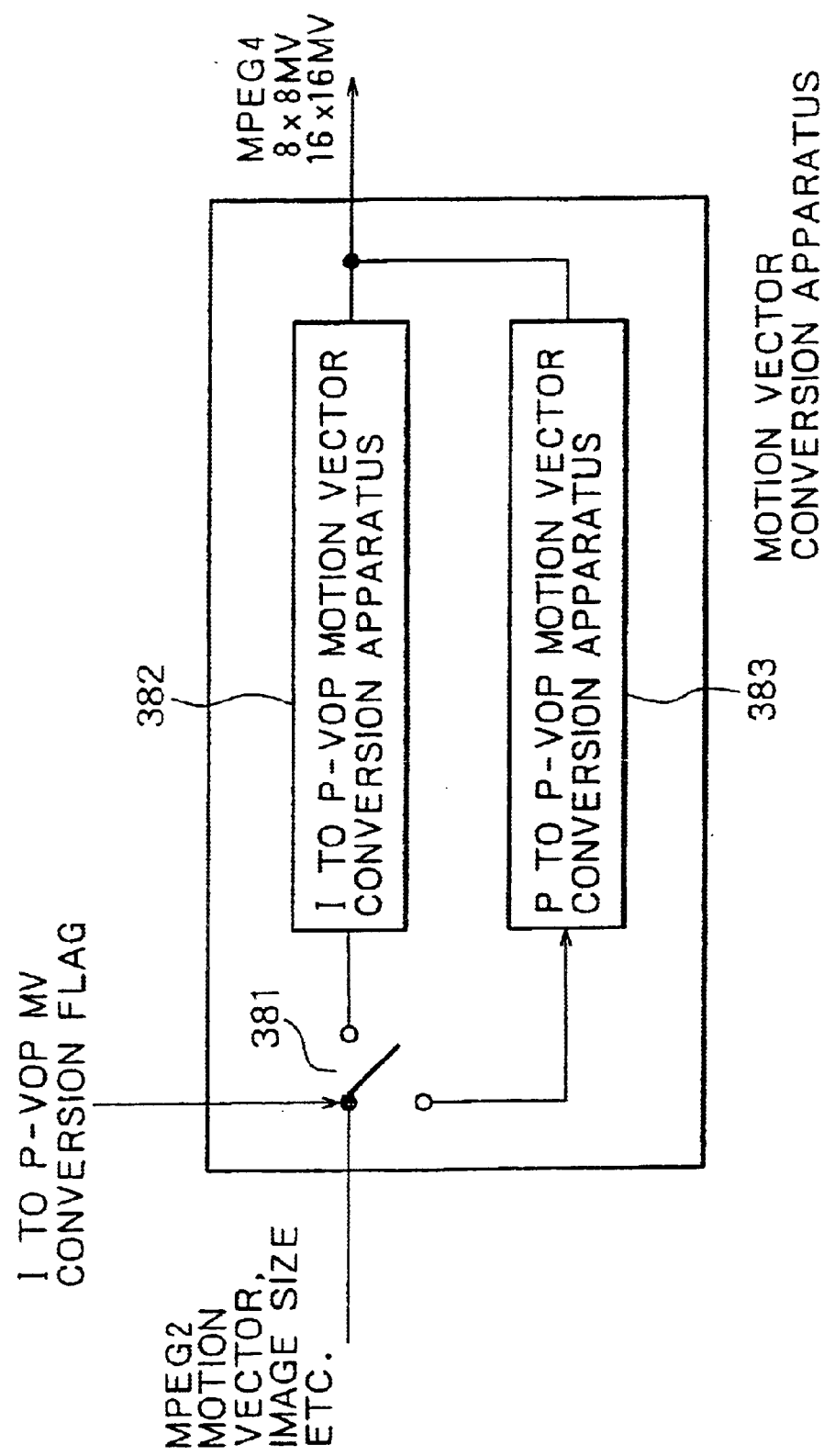
FIG. 36 is a block diagram showing a motion vector conversion apparatus to which the present invention is applied.

FIG. 36 shows a configuration of a motion vector conversion apparatus to which the present invention is applied. The motion vector conversion apparatus corresponds to the motion vector conversion apparatus 6 of FIG. 2. A switch 381 operates in response to an I to P-VOP motion vector (MV) conversion flag such that it is switched to an I to P-VOP motion vector conversion apparatus 382 side when the pertaining frame is an MPEG2 intra-frame to be converted into an MPEG4 frame and the immediately preceding MPEG2 frame is a P frame, but it is switched to a P to P-VOP motion vector conversion apparatus 383 side when the pertaining frame is any other frame.

The I to P-VOP motion vector conversion apparatus 382 is described below. The P to P-VOP motion vector conversion apparatus 383 performs processing similar to that of the motion vector conversion apparatus described hereinabove with reference to FIG. 2 in the description of the related art.

Figure 37:
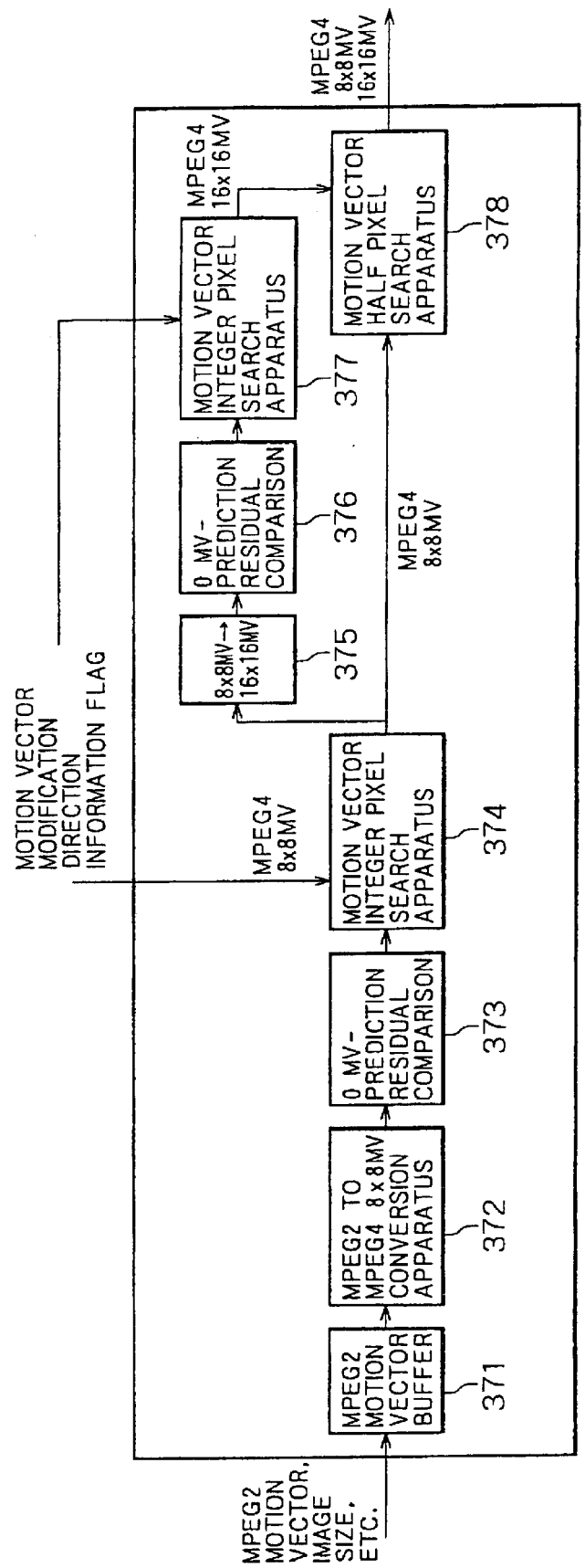
FIG. 37 is a block diagram showing an example of an I to P motion vector conversion apparatus to which the present invention is applied.

FIG. 37 shows a configuration of the I to P-VOP motion vector conversion apparatus. Referring to FIG. 37, motion vectors of a P frame immediately preceding to an I frame to be dropped are stored into an MPEG2 motion vector buffer 371 first. The motion vectors of the macro blocks at the same positions in the P frame to be dropped are duplicated into the macro blocks of the I frame. An MPEG2 to MPEG4 8×8 MV conversion apparatus 372 extends, after it performs spatial and temporal modification of the motion vectors described hereinabove in the description of the related art, the motion vectors to twice in the temporal direction so as to refer to a P frame immediately prior to the P frame to be dropped. Each of the thus converted 8×8 motion vectors of MPEG4 is inputted to a 0 MV-prediction residual comparison apparatus 373, by which a prediction residual of the 0 motion vector and a prediction residual of the 8×8 motion vector thus produced are compared with each other. Then, if the prediction residual of the 0 motion vector is smaller than the prediction residual of the produced 8×8 motion vector, then the 8×8 motion vector is replaced with 0. The 8×8 motion vector thus outputted from the 0 MV-prediction residual comparison apparatus 373 is used by a motion vector integer pixel search apparatus 374 to perform a re-search within an arbitrary search window designated with an integer pixel value in accordance with a method similar to that described hereinabove in the description of the related art to improve the prediction accuracy of the motion vector.

Then, an 8×8 MV to 16×16 MV conversion apparatus 375 receives the 8×8 motion vectors and the respective prediction residuals produced by the motion vector integer pixel search apparatus 374 as inputs thereto, and allocates the 8×8 motion vector of one of four blocks cooperatively forming each of the macro blocks which exhibits the smallest prediction residual to a 16×16 motion vector and outputs the 16×16 motion vector. A 0 MV-prediction residual comparison apparatus 376 receives the 16×16 motion vector produced by the 8×8 MV to 16×16 MV conversion apparatus 375 as an input thereto and compares it with the prediction residual of the 0 motion vector. If the prediction residual of the 0 motion vector is smaller than the produced 16×16 motion vector, then the 0 MV-prediction residual comparison apparatus 376 replaces the 16×16 motion vector with 0. The resulting 16×16 motion vector is inputted to a motion vector integer pixel search apparatus 377. The motion vector integer pixel search apparatus 377 performs a re-search for the 16×16 motion vector with integer pixels in accordance with the method described hereinabove in the description of the related art and outputs a resulting 16×16 motion vector. The 8×8 motion vectors and the 16×16 motion vector determined with integer pixel values are inputted to a motion vector half pixel search apparatus 378, from which 8×8 and 16×16 motion vectors of MPEG4 are outputted with a half pixel accuracy.

Although a bit stream representative of image compression information of MPEG2 is inputted and a bit stream representative of image compression information of MPEG4 is outputted as described above, the input and the output are not limited to the specific ones described, but they may otherwise be bit streams representative of image compression information, for example, of MPEG-1 or H.263.

While preferred embodiments of the present invention have been described using specific terms, such description is for illustrative purposes only, and it is to be understood that changes and variations may be made without departing from the spirit or scope of the following claims.

What is claimed is:

1. A motion vector conversion method for an image information conversion method wherein a bit stream representative of interlaced scanned image compression information of MPEG2 is inputted and a bit stream representative of progressively scanned image compression information of MPEG4 is outputted, comprising the steps of:

successively accepting 16×16 motion vectors of MPEG2 of the inputted bit stream representative of image compression information of MPEG2; and successively producing 8×8 motion vectors of MPEG4 and 16×16 motion vectors of MPEG4 based on the 16×16 motion vectors of MPEG2 such that every other one of P frames of the bit stream of MPEG2 is dropped to produce a bit stream of MPEG4 of a reduced frame rate and a low bit rate;

the successively producing step serving also as a motion vector modification step and including a step of storing information of each of macro blocks and between blocks in the inputted bit stream representative of image compression information of MPEG2 in advance, a step of duplicating motion vectors of a P frame immediately preceding reach P frame to be dropped based on the stored information and a step of extending the duplicated motion vectors to twice in the temporal direction to produce motion vectors of MPEG4 converted from an intraframe of MPEG2.

2. A motion vector conversion apparatus for an image information conversion apparatus wherein a bit stream representative of interlaced scanned image compression information of MPEG2 is inputted and a bit stream representative of progressively scanned image compression information of MPEG4 is outputted, comprising:

motion vector production means for accepting 16×16 motion vectors of MPEG2 of the inputted bit stream representative of image compression information of MPEG2 and successively producing 8×8 motion vectors of MPEG4 and 16×16 motion vectors of MPEG4;

dropping means for dropping every other one of P frames of the inputted bit stream of MPEG2 and supplying 16×16 motion vectors of MPEG2 of the remaining I frames and P frames to said motion vector production means so that a bit stream of MPEG4 of a reduced frame rate and a low bit rate may be produced by said motion vector production means; and storage means serving also as a motion vector modification apparatus for storing information of each of macro blocks and between blocks in the inputted bit stream representative of image compression information of MPEG2 in advance;

said motion vector production means being operable to duplicate motion vectors of a P frame immediately preceding each P frame to be dropped based on the information stored in said storage means and extend the duplicated motion vectors to twice in the temporal direction to produce motion vectors of MPEG4 converted from an intra-frame of MPEG2.

* * * * *

UNITED STATES PATENT AND TRADEMARK OFFICE
CERTIFICATE OF CORRECTION

PATENT NO.    : 6,826,231 B2                                                Page 1 of 1
DATED         : November 30, 2004
INVENTOR(S)   : Kuniaki Takahashi It is certified that error appears in the above-identified patent and that said Letters Patent is hereby corrected as shown below:

Column 27,
Line 33, replace "reach" with -- each --.

Signed and Sealed this

Twenty-seventh Day of September, 2005

JON W. DUDAS
*Director of the United States Patent and Trademark Office*